United States Patent
Kost et al.

(10) Patent No.: US 9,510,401 B1
(45) Date of Patent: Nov. 29, 2016

(54) REDUCED STANDBY POWER IN AN ELECTRONIC POWER CONTROL SYSTEM

(75) Inventors: Michael A. Kost, Cedar Park, TX (US); Karl Thompson, Converse, TX (US)

(73) Assignee: Cirrus Logic, Inc., Austin, TX (US)

( * ) Notice: Subject to any disclaimer, the term of this patent is extended or adjusted under 35 U.S.C. 154(b) by 726 days.

(21) Appl. No.: 13/217,115

(22) Filed: Aug. 24, 2011

Related U.S. Application Data

(60) Provisional application No. 61/376,443, filed on Aug. 24, 2010.

(51) Int. Cl.
H02J 9/00 (2006.01)
H05B 33/08 (2006.01)
H02M 1/42 (2007.01)

(52) U.S. Cl.
CPC ....... *H05B 33/0815* (2013.01); *H02M 1/4225* (2013.01); *H05B 33/0848* (2013.01); *Y10T 307/511* (2015.04)

(58) Field of Classification Search
USPC ........................................................ 315/297
See application file for complete search history.

(56) References Cited

U.S. PATENT DOCUMENTS

| | | |
|---|---|---|
| 3,790,878 A | 2/1974 | Brokaw |
| 4,677,366 A | 6/1987 | Wilkinson et al. |
| 4,683,529 A | 7/1987 | Bucher |
| 4,737,658 A | 4/1988 | Kronmuller et al. |
| 4,739,462 A | 4/1988 | Kost et al. |
| 4,937,728 A | 6/1990 | Leonardi |
| 4,940,929 A | 7/1990 | Williams |
| 4,977,366 A | 12/1990 | Powell |

(Continued)

FOREIGN PATENT DOCUMENTS

| | | |
|---|---|---|
| EP | 0536535 A1 | 4/1993 |
| EP | 0636889 A1 | 1/1995 |

(Continued)

OTHER PUBLICATIONS

Lee, "A Novel Electrode Power Profiler for Dimmable Ballasts Using DC Link Voltage and Switching Frequency Controls", IEEE Transactions on Power Electronics, vol. 19, No. 3, May 2004, pp. 847-853.*

(Continued)

*Primary Examiner* — Tuyet Vo
*Assistant Examiner* — James H. Cho
(74) *Attorney, Agent, or Firm* — Terrile, Cannatti, Chambers & Holland, LLP; Kent B. Chambers

(57) ABSTRACT

A system and method reduces power consumption by an electronic power control system when a controller of the electronic power control system reduces sense signal monitoring during a standby mode of the controller. The electronic power control system includes a controller to control a switching power converter. The controller operates in at least two modes, standby and active modes. Energy savings during standby mode can be achieved in a variety of current and/or voltage sensing configurations. During the standby mode, the controller generates a signal to at least intermittently disable sensing of an input voltage to the switching power converter or at least intermittently disabling sensing of an input voltage and an output voltage. Disabling sensing reduces energy losses associated with an input voltage sense signal itself and with circuitry in the controller used to process the input voltage signal.

24 Claims, 12 Drawing Sheets

(56) References Cited

U.S. PATENT DOCUMENTS

| | | |
|---|---|---|
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Itwasa |
| 6,628,106 B1 | 9/2003 | Batarseh et al. |
| 6,657,417 B1 | 12/2003 | Hwang |
| 6,696,803 B2 | 2/2004 | Tao et al. |
| 6,724,174 B1 | 4/2004 | Esteves et al. |
| 6,768,655 B1 | 7/2004 | Yang et al. |
| 6,781,351 B2 | 8/2004 | Mednik et al. |
| 6,839,247 B1 | 1/2005 | Yang |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,072,191 B2 | 7/2006 | Nakao et al. |
| 7,099,163 B1 | 8/2006 | Ying |
| 7,157,889 B2 * | 1/2007 | Kernahan et al. ............ 323/268 |
| 7,161,816 B2 | 1/2007 | Shteynberg et al. |
| 7,221,130 B2 | 5/2007 | Ribeiro et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu |
| 7,554,473 B2 | 6/2009 | Melanson |
| 7,606,532 B2 | 10/2009 | Wuidart |
| 7,647,125 B2 | 1/2010 | Melanson |
| 7,667,986 B2 | 2/2010 | Artusi et al. |
| 7,684,223 B2 | 3/2010 | Wei |
| 7,719,246 B2 * | 5/2010 | Melanson ............... 323/282 |
| 7,719,248 B1 | 5/2010 | Melanson |
| 7,746,043 B2 * | 6/2010 | Melanson ............... 323/224 |
| 7,755,525 B2 | 7/2010 | Nanda et al. |
| 7,804,480 B2 | 9/2010 | Jeon et al. |
| 7,821,237 B2 | 10/2010 | Melanson |
| 7,834,553 B2 | 11/2010 | Hunt et al. |
| 7,863,828 B2 | 1/2011 | Melanson |
| 7,872,883 B1 | 1/2011 | Elbanhawy |
| 7,888,922 B2 | 2/2011 | Melanson |
| 7,894,216 B2 | 2/2011 | Melanson |
| 7,969,125 B2 | 6/2011 | Melanson |
| 8,008,898 B2 | 8/2011 | Melanson et al. |
| 8,008,902 B2 | 8/2011 | Melanson et al. |
| 8,018,171 B1 | 9/2011 | Melanson et al. |
| 8,040,703 B2 | 10/2011 | Melanson |
| 8,076,920 B1 | 12/2011 | Melanson |
| 8,120,341 B2 | 2/2012 | Melanson |
| 8,125,805 B1 | 2/2012 | Melanson |
| 8,169,806 B2 | 5/2012 | Sims et al. |
| 8,179,110 B2 | 5/2012 | Melanson |
| 8,188,677 B2 | 5/2012 | Melanson et al. |
| 8,193,717 B2 | 6/2012 | Leiderman |
| 8,222,772 B1 | 7/2012 | Vinciarelli |
| 8,232,736 B2 | 7/2012 | Melanson |
| 8,242,764 B2 | 8/2012 | Shimizu et al. |
| 8,248,145 B2 | 8/2012 | Melanson |
| 8,344,707 B2 | 1/2013 | Melanson et al. |
| 8,369,109 B2 | 2/2013 | Niedermeier et al. |
| 8,441,210 B2 | 5/2013 | Shteynberg et al. |
| 8,487,591 B1 | 7/2013 | Draper et al. |
| 8,536,799 B1 | 9/2013 | Grisamore et al. |
| 8,610,364 B2 | 12/2013 | Melanson et al. |
| 8,654,483 B2 | 2/2014 | Etter |
| 8,803,439 B2 | 8/2014 | Stamm et al. |
| 8,816,593 B2 | 8/2014 | Lys et al. |
| 8,866,452 B1 | 10/2014 | Kost et al. |
| 8,912,781 B2 | 12/2014 | Singh et al. |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov |
| 2004/0037094 A1 | 2/2004 | Muegge et al. |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman |
| 2006/0013026 A1 | 1/2006 | Frank et al. |
| 2006/0022648 A1 | 2/2006 | Zeltser |
| 2006/0214603 A1 | 9/2006 | Oh et al. |
| 2007/0103949 A1 | 5/2007 | Tsuruya |
| 2008/0018261 A1 | 1/2008 | Kastner |
| 2008/0043504 A1 | 2/2008 | Ye |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0224636 A1 * | 9/2008 | Melanson ............... 315/307 |
| 2008/0259655 A1 | 10/2008 | Wei et al. |
| 2008/0272744 A1 * | 11/2008 | Melanson ............... 323/205 |
| 2008/0272747 A1 * | 11/2008 | Melanson ............... 323/205 |
| 2008/0272755 A1 * | 11/2008 | Melanson ............... 323/282 |
| 2008/0273356 A1 * | 11/2008 | Melanson ............... 363/47 |
| 2008/0278132 A1 | 11/2008 | Kesterson et al. |
| 2008/0310194 A1 | 12/2008 | Huang et al. |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferro |
| 2009/0243162 A1 | 10/2009 | Irissou et al. |
| 2009/0295228 A1 * | 12/2009 | Ochi ............... 307/66 |
| 2009/0295300 A1 | 12/2009 | King |
| 2010/0128501 A1 | 5/2010 | Huang et al. |
| 2010/0194198 A1 * | 8/2010 | Djenguerian ..... H02M 3/33507 307/31 |
| 2010/0225293 A1 * | 9/2010 | Wang ............... H02M 3/33507 323/290 |

(56) References Cited

U.S. PATENT DOCUMENTS

| | | |
|---|---|---|
| 2010/0238689 A1 | 9/2010 | Fei et al. |
| 2010/0244793 A1 | 9/2010 | Caldwell |
| 2011/0110132 A1 | 5/2011 | Rausch |
| 2011/0199793 A1 | 8/2011 | Kuang et al. |
| 2011/0276938 A1 | 11/2011 | Perry et al. |
| 2011/0291583 A1 | 12/2011 | Shen |
| 2011/0309760 A1 | 12/2011 | Beland et al. |
| 2012/0056551 A1 | 3/2012 | Zhu et al. |
| 2012/0146540 A1 | 6/2012 | Khayat et al. |
| 2012/0176819 A1 | 7/2012 | Gao et al. |
| 2012/0187997 A1 | 7/2012 | Liao et al. |
| 2012/0248998 A1 | 10/2012 | Yoshinaga |
| 2012/0320640 A1 | 12/2012 | Baurle et al. |
| 2013/0181635 A1 | 7/2013 | Ling |
| 2014/0218978 A1 | 8/2014 | Heuken et al. |

FOREIGN PATENT DOCUMENTS

| | | |
|---|---|---|
| EP | 1213823 A2 | 6/2002 |
| EP | 1289107 A3 | 8/2002 |
| EP | 1962263 A2 | 8/2008 |
| EP | 2232949 | 9/2010 |
| EP | 2257124 A1 | 12/2010 |
| JP | 2006022107 A1 | 3/2006 |
| JP | 2008053181 | 3/2006 |
| JP | 2008053181 A | 3/2006 |
| WO | 01/84697 A2 | 11/2001 |
| WO | 2004/051834 A1 | 6/2004 |
| WO | 20060013557 | 2/2006 |
| WO | 20060022107 JP | 3/2006 |
| WO | 2007016373 A3 | 2/2007 |
| WO | 2008/004008 A2 | 1/2008 |
| WO | 20080152838 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

Texas Instruments, High Performance Power Factor Preregulator, UC2855A/B and UC3855A/B, SLUS328B, Jun. 1998, Revised Oct. 2005, pp. 1-14, Dallas, TX, USA.

Balogh, Laszlo, et al,Power-Factor Correction with Interleaved Boost Converters in Continuous-Inductr-Current Mode, 1993, IEEE, pp. 168-174, Switzerland.

Cheng, Hung L., et al, A Novel Single-Stage High-Power-Factor Electronic Ballast with Symmetrical Topology, Power Electronics and Motion Control Conference, 2006. IPEMC 2006. CES/IEEE 5th International, Aug. 14-16, 2006, vol. 50, No. 4, Aug. 2003, pp. 759-766, Nat. Ilan Univ., Taiwan.

Fairchild Semiconductor, Theory and Application of the ML4821 Average Current Mode PFC Controllerr, Fairchild Semiconductor Application Note 42030, Rev. 1.0, Oct. 25, 2000, pp. 1-19, San Jose, California, USA.

Garcia, O., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.

Infineon Technologies AG, Standalone Power Factor Correction (PFC) Controller in Continuous Conduction Mode (CCM), Infineon Power Management and Supply, CCM-PFC, ICE2PCS01, ICE2PCSO1G, Version 2.1, Feb. 6, 2007, p. 1-22, Munchen, Germany.

Lu, et al, Bridgeless PFC Implementation Using One Cycle Control Technique, International Rectifier, 2005, pp. 1-6, Blacksburg, VA, USA.

Brown, et al, PFC Converter Design with IR1150 One Cycle Control IC, International Rectifier, Application Note AN-1077, pp. 1-18, El Segundo CA, USA.

International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.

International Rectifier, IRAC1150-300W Demo Board, User's Guide, Rev 3.0, International Rectifier Computing and Communications SBU—AC-DC Application Group, pp. 1-18, Aug. 2, 2005, El Segundo, CO USA.

Lai, Z., et al, A Family of Power-Factor-Correction Controllerr, Applied Power Electronics Conference and Exposition, 1997. APEC '97 Conference Proceedings 1997., Twelfth Annual, vol. 1, pp. 66-73, Feb. 23-27, 1997, Irvine, CA.

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Horn, Kowloon, Hong Kong.

Linear Technology, Single Switch PWM Controller with Auxiliary Boost Converter, Linear Technology Corporation, Data Sheet LT1950, pp. 1-20, Milpitas, CA, USA.

Linear Technology, Power Factor Controller, Linear Technology Corporation, Data Sheet LT1248, pp. 1-12, Milpitas, CA, USA.

Supertex, Inc., HV9931 Unity Power Factor LED Lamp Driver, Supertex, Inc., Application Note AN-H52, 2007, pp. 1-20, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Erickson, Robert W., et al, Fundamentals of Power Electronics, Second Edition, Chapter 6, 2001, pp. 131-184, Boulder CO, USA.

Fairchild Semiconductor, Theory and Application of the ML4821 Average Current Mode PFC Controller, Fairchild Semiconductor, Application Note 42030, Rev. 1.0, Oct. 25, 2000, pp. 1-19, San Jose, CA, USA.

Fairchild Semiconductor, 500W Power-Factor-Corrected (PFC) Converter Design with FAN4810, Application Note 6004, Rev. 1.0.1, Oct. 31, 2003, San Jose, CA, USA.

Fairfield Semiconductor, Power Factor Correction (PFC) Basics, Application Note 42047, Rev. 0.9.0, Aug. 19, 2004, San Jose, CA, USA.

Fairchild Semiconductor, Design of Power Factor Correction Circuit Using FAN7527B, Application Note AN4121, Rev. 1.0.1, May 30, 2002, San Jose, CA, USA.

Fairchild Semiconductor, Low Start-Up Current PFC/PWM Controller Combos FAN4800, Rev. 1.0.6, Nov. 2006, San Jose, CA, USA.

Fairchild Semiconductor, Power Factor Correction Controller FAN4810, Rev. 1.0.12, Sep. 24, 2003, San Jose, CA, USA.

Fairchild Semiconductor, ZVS Average Current PFC Controller Fan 4822, Rev. 1.0.1, Aug. 10, 2001, San Jose, CA, USA.

Fairchild Semiconductor, Ballast Control IC FAN7532, Rev. 1.0.2, Jun. 2006, San Jose, CA, USA.

Fairchild Semiconductor, Simple Ballast Controller FAN7544, Rev. 1.0.0, Sep. 21, 2004, San Jose, CA, USA.

Fairchild Semiconductor, Power Factor Correction Controller FAN7527B, Aug. 16, 2003, San Jose, CA, USA.

Fairchild Semiconductor, Ballast Control IC FAN7711, Rev. 1.0.2, 2007, San Jose, CA, USA.

Fairchild Semicondctor, Simple Ballast Controller, KA7541, Rev. 1.0.3, Sep. 27, 2001, San Jose, CA, USA.

Fairchild Semiconductor, Power Factor Controller, ML4812, Rev. 1.0.4, May 31, 2001, San Jose, CA, USA.

Fairchild Semiconductor, Power Factor Controller, ML4821, Rev. 1.0.2, Jun. 19, 2001, San Jose, CA, USA.

Freescale Semiconductor, Dimmable Light Ballast with Power Factor Correction, Designer Reference Manual, DRM067, Rev. 1, Dec. 2005, M681-1C08 Microcontrollers, Chandler, AZ, USA.

Freescale Semiconductor, Design of Indirect Power Factor Correction Using 56F800/E, Freescale Semiconductor Application Note, AN1965, Rev. 1, Jul. 2005, Chandler, AZ, USA.

Freescale Semiconductor, Implementing PFC Average Current Mode Control using the MC9S12E128, Application Note AN3052,

(56) References Cited

OTHER PUBLICATIONS

Addendum to Reference Design Manual DRM064, Rev. 0, Nov. 2005, Chandler, AZ, USA.
Hirota, et al, Analysis of Single Switch Delta-Sigma Modulated Pulse Space Modulation PFC Converter Effectively Using Switching Power Device, Power Electronics Specialists Conference, 2002. pesc Feb. 2002 IEEE 33rd Annual, vol. 2, pp. 682-686, Hyogo Japan.
Madigan, et al, Integrated High-Quality Rectifier-Regulators, Industrial Electronics, IEEE Transactions, vol. 46, Issue 4, pp. 749-758, Aug. 1999, Cary, NC, USA.
Maksimovic, et al, Impact of Digital Control in Power Electronics, International Symposium on Power Semiconductor Devices and ICS, 2004, Boulder, CO, USA.
Mammano, Bob, Current Sensing Solutions for Power Supply Designers, Texas Instruments, 2001, Dallas TX.
Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.
Noon, Jim, High Performance Power Factor Preregulator UC3855A/B, Texas Instruments Application Report, SLUA146A, May 1996—Revised Apr. 2004, Dallas TX, USA.
NXP Semiconductors, TEA1750, GreenChip III SMPS Control IC Product Data Sheet, Rev.01, Apr. 6, 2007, Eindhoven, The Netherlands.
Turchi, Joel, Power Factor Correction Stages Operating in Critical Conduction Mode, ON Semiconductor, Application Note AND8123/D, Sep. 2003—Rev. 1 , Denver, CO, USA.
ON Semiconductor, GreenLLine Compact Power Factor Controller: Innovative Circuit for Cost Effective Solutions, MC33260, Semiconductor Components Industries, Sep. 2005—Rev. 9, Denver, CO, USA.
ON Semiconductor, Enhanced, High Voltage and Efficient Standby Mode, Power Factor Controller, NCP1605, Feb. 2007, Rev. 1, Denver, CO, USA.
ON Semiconductor, Cost Effective Power Factor Controller, NCP1606, Mar. 2007, Rev. 3, Denver, CO, USA.
ON Semiconductor, Power Factor Controller for Compact and Robust, Continuous Conduction Mode Pre-Converters, NCP1654, Mar. 2007, Rev. PO, Denver, CO, USA.
Philips Semiconductors, 90W Resonant SMPS with TEA1610 SwingChip, Application Note AN99011, Sep. 14, 1999, The Netherlands.
Prodic, et al, Dead-Zone Digital Controller for Improved Dynamic Response of Power Factor Preregulators, Applied Power Electronics Conference and Exposition, 2003. APEC '03. Eighteenth Annual IEEE, Feb. 9-13, 2003, vol. 1, pp. 382-388, Boulder, CO, USA.
Prodic, et al, Digital Controller for High-Frequency Rectifiers with Power Factor Correction Suitable for On-Chip Implementation, Power Conversion Conference-Nagoya, 2007. PCC '07, Apr. 2-5, 2007, pp. 1527-1531, Toronto, Canada.
Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.
Renesas, Renesas Technology Releases Industry's First Critical-Conduction-Mode Power Factor Correction Control IC Implementing Interleaved Operations, R2A20112, Dec. 18, 2006, Tokyo, Japan.
Renesas, PFC Control IC R2A20111 Evaluation Board, Application Note R2A20111 EVB, Feb. 2007, Rev. 1.0, Tokyo, Japan.
Renesas, Power Factor Correction Controller IC, HA16174P/FP, Rev. 1.0, Jan. 6, 2006, Tokyo, Japan.
Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.
STMicroelectronics, Transition-Mode PFC Controller, Datasheet L6562, Rev. 8, Nov. 2005, Geneva, Switzerland.
STMicroelectronics, Electronic Ballast with PFC Using L6574 and L6561, Application Note AN993, May 2004, Geneva Switzerland.
STMicroelectronics, Advanced Transition-Mode PFC Controller L6563 and L6563A, Mar. 2007, Geneva Switzerland.
STMicroelectronics, CFL/TL Ballast Driver Preheat and Dimming, L6574, Sep. 2003, Geneva Switzerland.
STMicroelectronics, Power Factor Corrector, L6561, Rev. 16, Jun. 2004, Geneva, Switzerland.
Texas Instruments, Avoiding Audible Noise at Light Loads When Using Leading Edge Triggered PFC Converters, Application Report SLUA309A, Mar. 2004—Revised Sep. 2004, Dallas, TX, USA.
Texas Instruments, Startup Current Transient of the Leading Edge Triggered PFC Controllers, Application Report SLUA321, Jul. 2004, Dallas, TX, USA.
Texas Instruments, Current Sense Transformer Evaluation UCC3817, Application Report SLUA308, Feb. 2004, Dallas, TX, USA.
Texas Instruments, 350-W, Two-Phase Interleaved PFC Pre-regulator Design Review, Application Report SLUA369B, Feb. 2005—Revised Mar. 2007, Dallas, TX, USA.
Texas Instruments, Average Current Mode Controlled Power Factor Correction Converter using TMS320LF2407A, Application Report SPRA902A, Jul. 2005, Dallas, TX, USA.
Texas Instruments, Transition Mode PFC Controller, UCC28050, UCC28051, UCC38050, UCC38051, Application Note SLUS5150, Sep. 2002—Revised Jul. 2005, Dallas TX, USA.
Texas Instruments, Interleaving Continuous Conduction Mode PFC Controller, UCC28070, SLUS794C, Nov. 2007—Revised Jun. 2009, Dallas, TX, USA.
Texas Instruments, BiCMOS Power Factor Prerefulator Evaluation Board UCC3817, User's Guide, SLUU077C, Sep. 2000—Revised Nov. 2002, Dallas, TX, USA.
ON Semiconductor, Four Key Steps to Design a Continuous Conduction Mode PFC Stage Using the NCP1653, Application Note AND8184/D, Nov. 2004, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, Dallas, TX, USA.
Unitrode, Optimizing Performance in UC 3854 Power Factor Correction Applications, Design Note DDN-39E, 1999, Merrimack, ME, USA.
Unitrode, High Power-Factor Preregulator, UC1852, UC2852, UC3852, Feb. 5, 2007, Merrimack, ME, USA.
Unitrode, UC3854A/B and UC3855A/B Provide Power Limiting with Sinusoidal Input Current for PFC Front Ends, SLUA196A, Design Note DN-66, Jun. 1995—Revised Nov. 2001, Merrimack, ME, USA.
Unitrode, Programmable Output Power Factor Preregulator, UCC2819, UCC3819, SLUS482B, Apr. 2001—Revised Dec. 2004, Merrimack, ME, USA.
Yao, et al, Soft Switching Circuit for Interleaved Boost Converters, IEEE Transactions on Power Electronics, vol. 22, No. 1, Jan. 2007, pp. 80-86, Zhejiang Univ., Hangzhou.
Zhang, et al, A New Duty Cycle Control Strategy for Power Factor Correction and FPGA Implementation, IEEE Transactions on Power Electronics, vol. 21, No. 6, Nov. 2006, pp. 1745-1753, Ontario, Canada.
Zhou, et al, Novel Sampling Algorithm for DSP Controlled 2kW PFC Converter, IEEE Transactions on Power Electronics, vol. 16, No. 2, Mar. 2001, pp. 217-222, Zhejiang Univ., Hangzhou.
Texas Instruments, UCC281019, 8-Pin Continuous Conduction Mode (CCM) PFC Controller, SLU828B, Revised Apr. 2009, all pages, Dallas, Texas, USA.
http://toolbarpdf.com/docs/functions-and-features-of-inverters.html printed on Jan. 20, 2011.
Su, et al, Ultra Fast Fixed-Frequency Hysteretic Buck Converter with Maximum Charging Current Control and Adaptive Delay Compensation for DVS Applications, IEEE Journal of Solid-State

(56) References Cited

OTHER PUBLICATIONS

Circuits, vol. 43, No. 4, Apr. 2008, pp. 815-822, Hong Kong University of Science and Technology, Hong Kong, China.

Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.

Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.

* cited by examiner

REDUCED STANDBY POWER IN AN ELECTRONIC POWER CONTROL SYSTEM

CROSS-REFERENCE TO RELATED APPLICATION

This application claims the benefit under 35 U.S.C. §119 (e) and 37 C.F.R. §1.78 of U.S. Provisional Application No. 61/376,443 filed on Aug. 24, 2010, and entitled "Reduced Standby Power in Power Factor Correction Applications," and is incorporated by reference in its entirety.

BACKGROUND OF THE INVENTION

1. Field of the Invention

The present invention relates in general to the field of electronics, and more specifically to a method and system for reducing standby power in an electronic power control system.

2. Description of the Related Art

Power control systems often utilize a switching power converter to convert alternating current (AC) voltages to direct current (DC) voltages or DC-to-DC. Switching power converters provide power factor corrected and regulated output voltages to many devices that utilize a regulated output voltage. Exemplary devices that utilize a regulated output voltage include lamps, such as light emitting diode and gas discharge type lamps, cellular telephones, computing devices, personal digital assistants, and power supplies.

Generally, a controller controls the conversion of power by a switching power converter. The controllers have an active mode to actively control the switching power converter when the switching power converter is providing power to a load. To save energy, some controllers also have a standby mode. During standby mode, the controller enters a low power consumption state because low power demands by a load connected to the switching power converter do not require the controller to control the switching power converter.

FIG. 1 depicts an electronic power control system 100 that includes a controller 102 that controls the operation of, and, thus, the delivery of power by switching power converter 104 to load 132. Voltage source 106 supplies an alternating current (AC) input voltage $V_{IN}$ to a full bridge diode rectifier 108. The voltage source 106 is, for example, a public utility, and the AC voltage $V_{IN}$ is, for example, a 60 Hz/110 V line voltage in the United States of America or a 50 Hz/220 V line voltage in Europe. The full bridge rectifier 108 supplies a rectified AC voltage $V_X$ to the switching power converter 104. Capacitor 110 filters high frequency components from rectified voltage $V_X$.

To control the operation of switching power converter 104, controller 102 generates a control signal $CS_0$ to control conductivity of field effect transistor (FET) switch 124. The control signal $CS_0$ is a pulse width modulated signal. Control signal $CS_0$ waveform 126 represents an exemplary control signal $CS_0$. Each pulse of control signal $CS_0$ turns switch 124 ON (i.e. conducts), and the inductor current $i_L$ energizes inductor 128. Diode 127 prevents current flow from link capacitor 130 into switch 124. When the pulse ends, the inductor 128 reverses voltage polarity (commonly referred to as "flyback") and the inductor current $i_L$ charges link capacitor 130 through diode 127. The switching power converter 104 is a boost-type converter because the link voltage $V_{LINK}$ is greater than the rectified input voltage $V_X$. Controller 102 operates the switching power converter 104 to maintain an approximately constant link voltage $V_{LINK}$ for load 132 and provide power factor correction. Load 132 can be any type of load that utilizes the link voltage, such as lamps, such as light emitting diode and gas discharge type lamps, cellular telephones, computing devices, personal digital assistants, and power supplies.

To control operation of switching power converter 104, controller 102 monitors a sense signal $V_{X\_SENSE}$, which represents the rectified voltage $V_X$, and monitors a sense signal $V_{LINK\_SENSE}$, which represents the link voltage $V_{LINK}$. Resistors 112 and 114 provide a voltage divider between the reference voltage $V_{REF}$ and the input voltage $V_X$ at node 116. $V_{X\_SENSE}$ is the voltage across resistor 114, and, thus, represents the rectified voltage $V_X$. Resistors 118 and 120 provide a voltage divider between the reference voltage $V_{REF}$ and the link voltage at node 122. $V_{LINK\_SENSE}$ is the voltage across resistor 120, and, thus, represents the link voltage $V_{LINK}$. Controller 102 uses the sense signals $V_{X\_SENSE}$ and $V_{LINK\_SENSE}$ to generate the control signal $CS_0$ using well-known control circuitry.

When switching power converter 104 no longer needs switch 124 to conduct to supply the power requirements of load 132, the controller 102 enters standby mode. Thus, in standby mode, controller 102 does not generate control signal $CS_0$ and thereby minimizes power usage. However, in standby mode, controller 102 still requires power to continually monitor the sense signals $V_{X\_SENSE}$ and $V_{LINK\_SENSE}$ in order to ascertain the state of the switching power converter 104. By monitoring the state of switching power converter 104, the controller 102 can determine when to exit standby mode and resume generating controls signal $CS_0$. Thus, sense currents $i_{VX\_SENSE}$ and $i_{LINK\_SENSE}$ continue to flow during standby mode, which results in additional energy usage by electronic power control system 100 during standby mode. Controller 102 resumes in the active mode when power requirements of the load 132 indicate a need to resume operation of switching power converter 104.

SUMMARY OF THE INVENTION

In one embodiment of the present invention, a method includes during standby mode of a switching power converter controller: at least intermittently disabling sensing of an input voltage to the switching power converter and sensing the link voltage at least intermittently. The method also includes exiting the standby mode and enabling sensing of the input voltage when the sensed link voltage indicates a predetermined power demand by a load coupled to the switching power converter. During the standby mode the switching power converter controller ceases generating a control switch signal to control power conversion by the switching power converter.

In a further embodiment of the present invention,

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
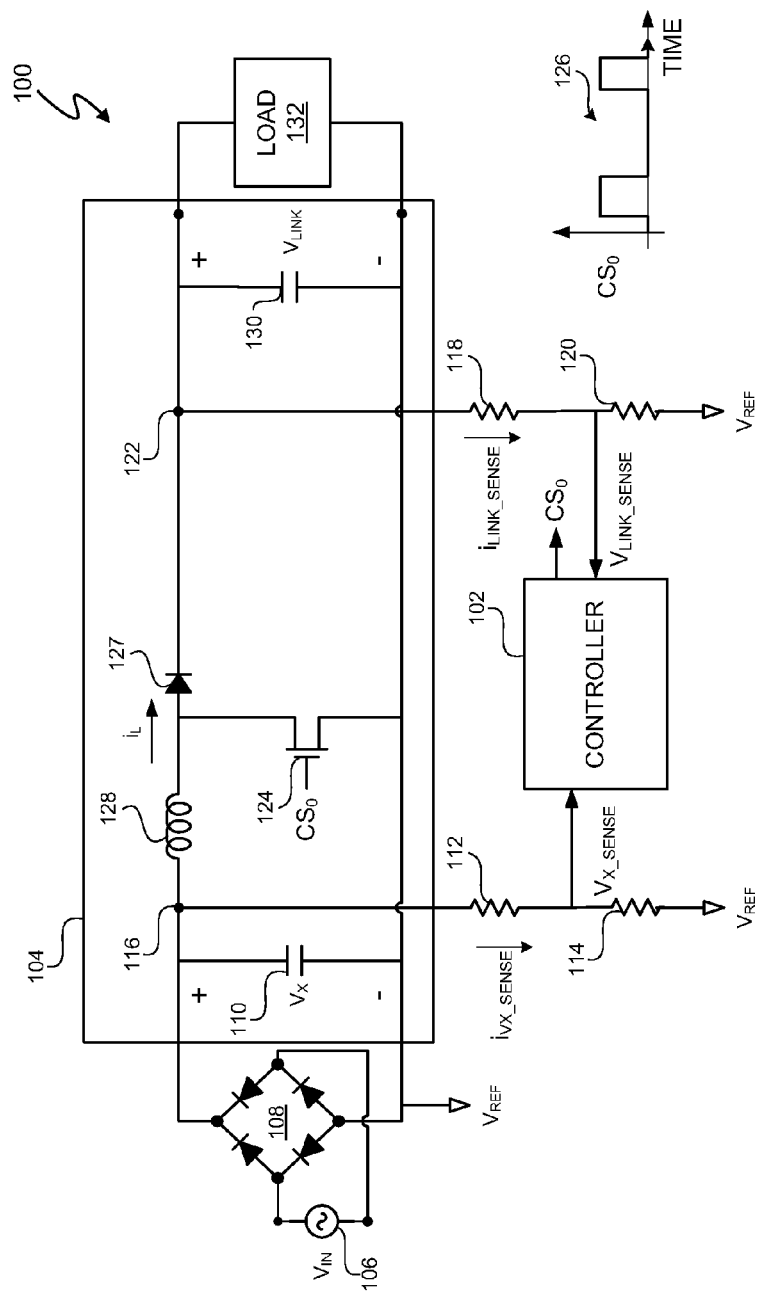
FIG. 1 (labeled prior art) depicts an electronic power control system with continuous monitoring of input and link voltages by a controller.

A system and method reduces power consumption by an electronic power control system when a controller of the electronic power control system reduces sense signal monitoring during a standby mode of the controller. The electronic power control system includes a controller to control a switching power converter. The controller operates in at least two modes, standby and active. Energy savings during standby mode can be achieved in a variety of current and/or voltage sensing configurations. During the standby mode, the controller generates a signal to at least intermittently disable sensing of an input voltage to the switching power converter or at least intermittently disabling sensing of an input voltage and a link voltage. Disabling sensing reduces energy losses associated with an input voltage sense signal itself and with circuitry in the controller used to process the input voltage signal. Thus, in at least one embodiment, during standby mode, the controller reduces standby power and saves energy associated with sensing the input voltage.

In at least one embodiment, to obtain additional energy savings, the link voltage is sensed periodically while the controller operates in standby mode. For example, in one embodiment, the controller intermittently enables and disables sensing the link voltage during standby mode. Enabling and disabling sensing of the link voltage provides further energy savings by, for example, reducing energy losses associated with link voltage sense signal itself and with circuitry in the controller used to process the link voltage signal.

The particular implementation of the controller is a matter of design choice. In at least one embodiment, the controller is a hysteretic converter that uses the sensed link voltage to detect changes in the link voltage, which indicate power demand by the load. In at least one embodiment, when the link voltage rises above a standby mode voltage threshold, the link voltage indicates that power demand by the load has decreased to a level that allows the controller to enter standby mode. When the link voltage decreases to an active mode voltage threshold, the link voltage indicates that the power demand be the load has increased to a level so that the controller enters the active mode. In at least one embodiment, since the standby mode voltage threshold is greater than the active mode voltage threshold, the controller there is hysteresis in the entering and exiting of standby mode.

In at least one embodiment, the controller uses a sensed link voltage to directly determine power demand by a load and thereby determine an appropriate operational mode of the controller. Power demand by the load can be determined in any number of ways. In at least one embodiment, the controller compares the link voltage directly to one or more threshold voltages to determine power utilization of the load. For example, in at least one embodiment, the controller utilizes a proportional integrator and a sensed link voltage to determine a power utilization factor. The power utilization factor represents power utilization by the load. Thus, in at least one embodiment, when the power utilization factor increases above a threshold value, the controller enters the active mode. When the power utilization factor decreases below the threshold, the controller enters the standby mode.

When the controller operates in the active mode, the controller actively controls power conversion by the switching power converter. In at least one embodiment, during the active mode, the controller monitors both the input and link voltages of the switching power converter. Intermittent enabling and/or disabling can be periodic or non-periodic.

Figure 2:
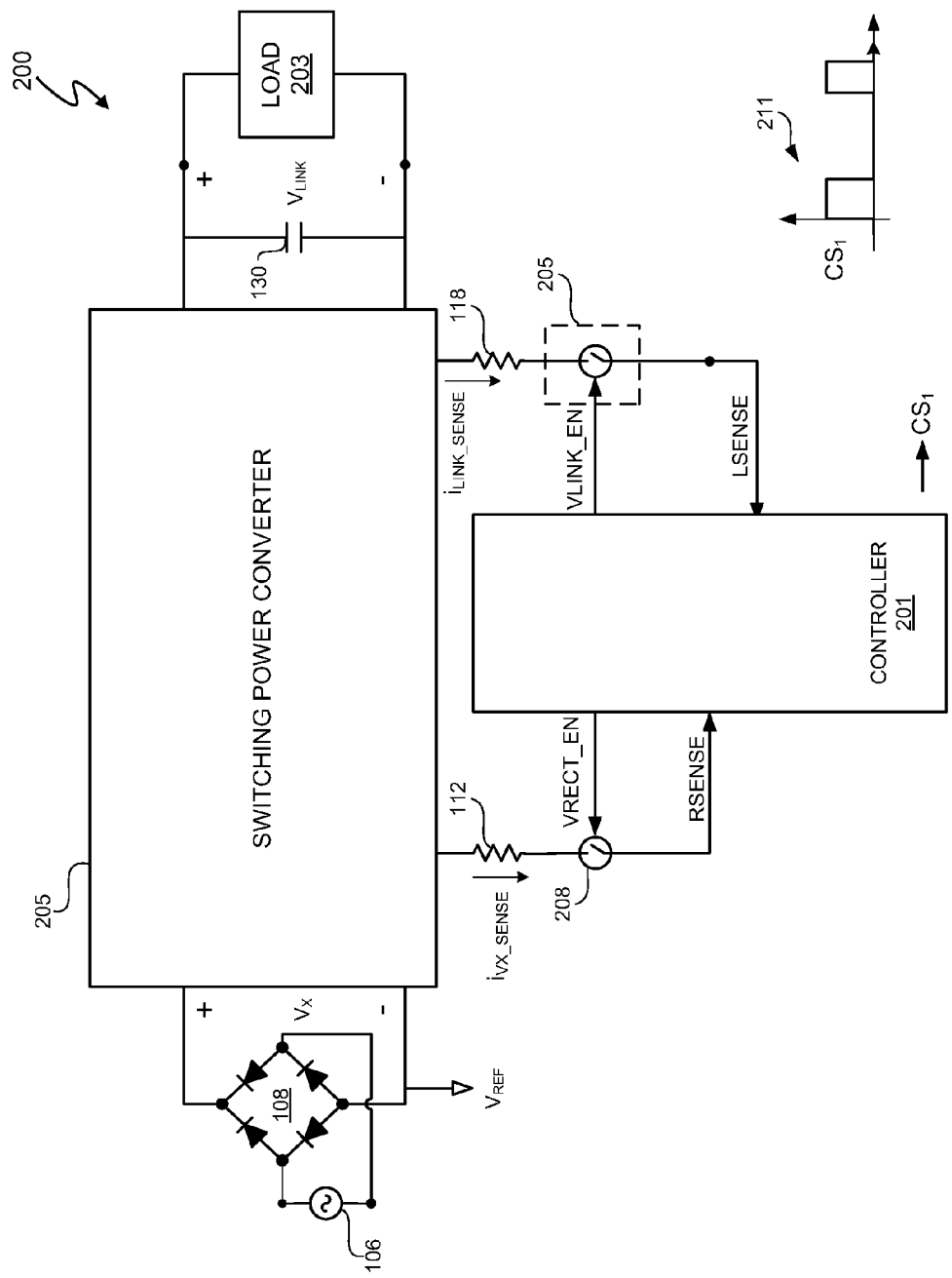
FIG. 2 depicts an electronic power control system that includes a controller that selectively enables and disables sensing of an input voltage and a link voltage.

FIG. 2 depicts an electronic power control system 200 that includes a controller 201 that selectively enables and disables sensing of an input voltage $V_X$ and a link voltage $V_{LINK}$. In at least one embodiment, controller 201 has at least two modes of operation, standby mode and active mode. The controller 201 consumes less power in standby mode than in the active mode. One way controller 201 reduces power consumption is by selectively enabling and disabling sensing of an input voltage $V_X$ and a link voltage $V_{LINK}$ during standby mode. Controller 201 selectively enables and disables sensing of the input voltage $V_X$ and the link voltage $V_{LINK}$ by respectively generating the input sense enable signal VRECT_EN and the link sense enable signal VLINK_EN. In at least one embodiment, during standby mode, controller 201 causes the link sense enable signal VLINK_EN to turn switch 208 OFF (i.e. nonconductive). Thus, the input voltage sense current $i_{VX\_SENSE}$ does not flow through resistor 112, and controller 201 does not monitor or process the sense signal RSENSE, which represents the input voltage $V_X$.

During active mode, controller 201 causes the link sense enable signal VLINK_EN to turn switch 208 ON (i.e. conductive). Thus, the input voltage sense current $i_{VX\_SENSE}$ flows through resistor 112, and controller 201 utilizes the sense signal RSENSE to generate the control signal $CS_1$. Signal 211 depicts an exemplary duty cycle modulate control signal $CS_1$. During standby mode, in at least one embodiment, controller 201 continuously monitors the link voltage $V_{LINK}$ by causing the link sense enable signal VLINK_EN signal to enable and disable switch 205. In at least one embodiment, switch 205 is not included in the electronic power converter system 200, and controller 201 continuously senses the link voltage via the link voltage sense signal LSENSE. As subsequently discussed in more detail, controller 201 utilizes a sensed link voltage $V_{LINK}$ to determine the power demand of load 203 and, thereby, determining whether to operate in standby mode or active mode. Load 203 can be any type of load that utilizes the link voltage, such as lamps, such as light emitting diode and gas discharge type lamps, cellular telephones, computing devices, personal digital assistants, and power supplies.

The control signal $CS_1$ controls the switching power converter 205. The switching power converter 205 can be any type of switching power converter, such as boost converter, a buck converter, a boost-buck converter, or a Cúk converter. In at least one embodiment, switching power converter 205 is identical to boost converter 104. The switching power converter 205 converts power from the rectified voltage $V_X$ from voltage supply 106 and rectifier 108 into a link voltage $V_{LINK}$ for load 203.

Figure 2A:
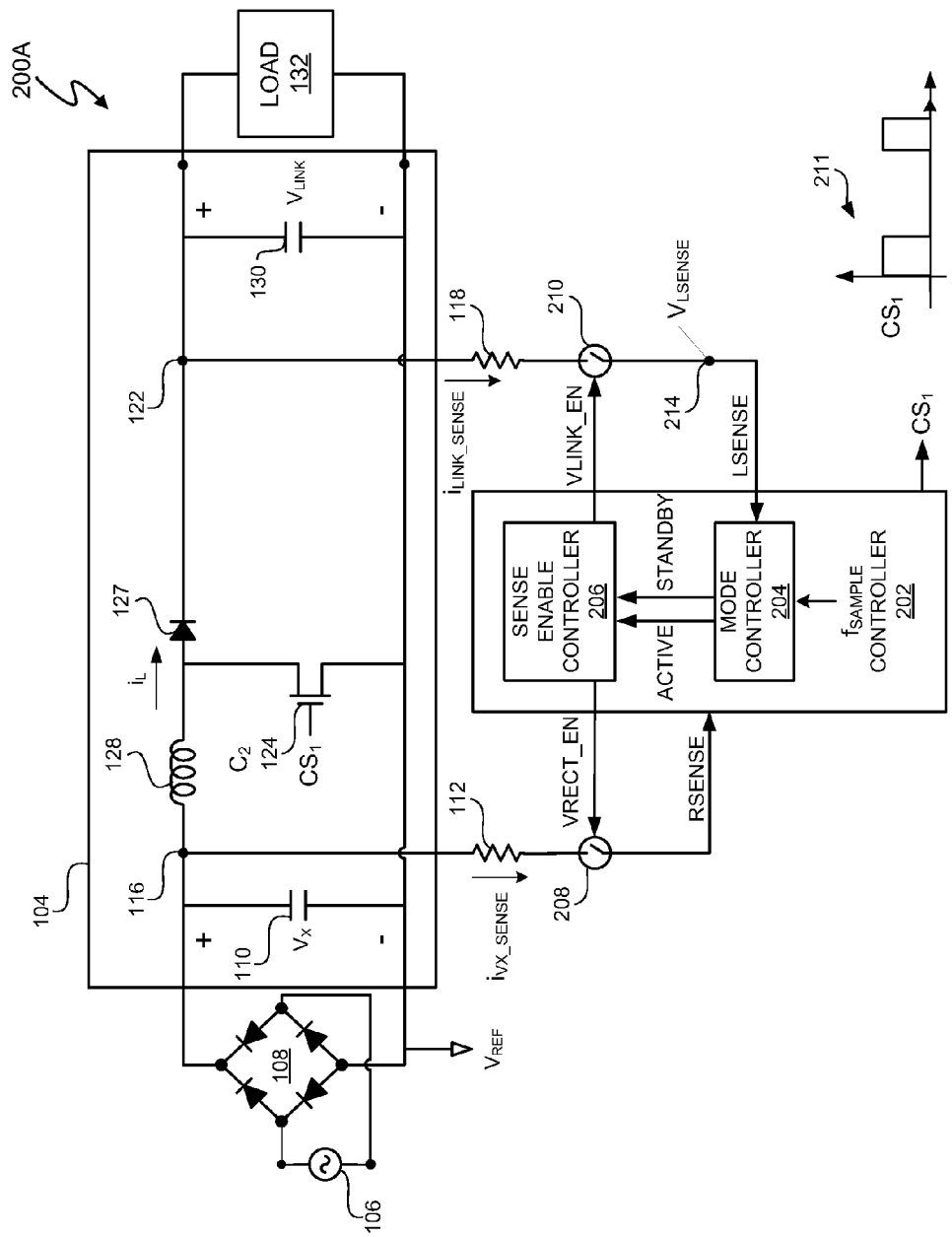
FIG. 2A depicts an electronic power control system having a controller to at least intermittently disable sensing of an input voltage and an output voltage to the switching power converter during standby mode.
Figure 3:
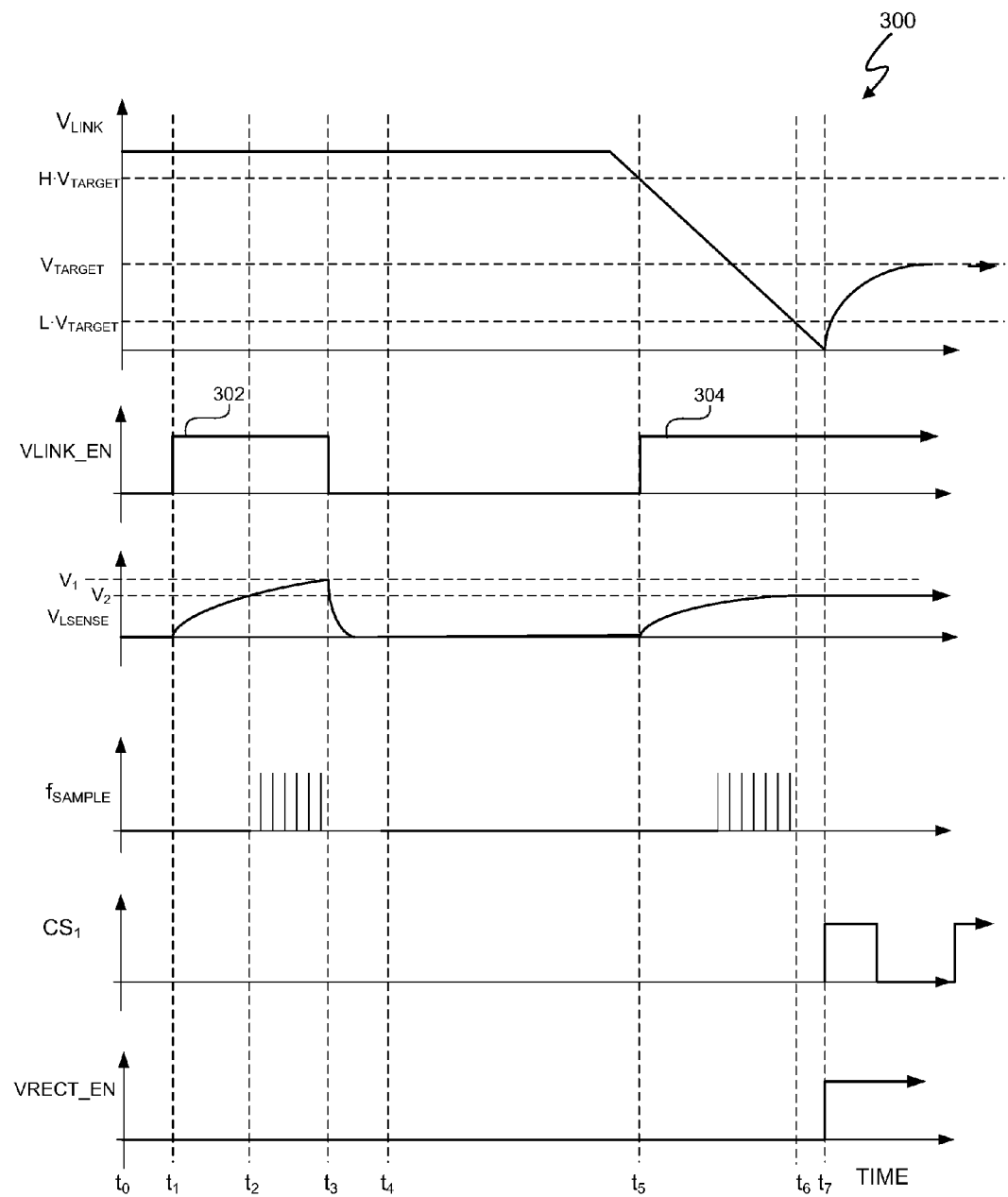
FIG. 3 exemplary signals associated with the electronic power control system of FIG. 2A.

FIG. 2A depicts an electronic power control system 200A, which represents one embodiment of electronic power control system 200. The electronic power control system 200A includes a controller 202 that selectively enables and disables sensing of an input voltage $V_X$ and a link voltage $V_{LINK}$. Controller 202 represents one embodiment of controller 201 of electronic power control system 200 (FIG. 2). FIG. 3 depicts exemplary signals 300 associated with the electronic power control system 200A. Referring to FIGS. 2A and 3, controller 202 includes a mode controller 204 to determine whether controller 202 operates in standby mode or active mode. In standby mode, controller 202 reduces power consumption versus power consumed during the active mode. One way controller 202 reduces power consumption is by selectively enabling and disabling sensing of an input voltage $V_X$ and a link voltage $V_{LINK}$ during standby mode.

Determining when and how to operate in standby mode or active mode is a matter of design choice. In at least one embodiment, when the link voltage $V_{LINK}$ is greater than a target threshold voltage $V_{TARGET}$ by a certain percentage, such as 15%, then mode controller 204 generates a "STANDBY" signal (shown in FIG. 4). Generation of the STANDBY signal causes the controller 202 to enter standby mode. In FIG. 3, the link voltage $V_{LINK}$ is greater than "H" times the target voltage $V_{TARGET}$, i.e. $V_{LINK} > H \cdot V_{TARGET}$. "H" is a multiplication factor corresponding to the percentage increase in the link voltage above $V_{TARGET}$, which is used by mode controller 204 to trigger entry into standby mode. The value of H is a design choice. In at least one embodiment, H equals 1.15, which corresponds to a 15% increase in the link voltage $V_{LINK}$ above the target voltage $V_{TARGET}$. The link voltage $V_{LINK}$ is an indicator of when to enter standby mode because the link voltage $V_{LINK}$ increases when power consumption by the load 203 decreases. An increase in the link voltage above the standby mode threshold voltage $H \cdot V_{TARGET}$ indicates that, under existing circumstances, the switching power converter 104 can provide sufficient power to the load 203 without operating switch 124. Therefore, in standby mode, controller 202 ceases generating control signal $CS_1$. In at least one embodiment, the target voltage $V_{TARGET}$ is set within the controller 202, either via, for example, a programmable setting or a hardwired setting, based on voltage specifications of load 203.

Figure 5:
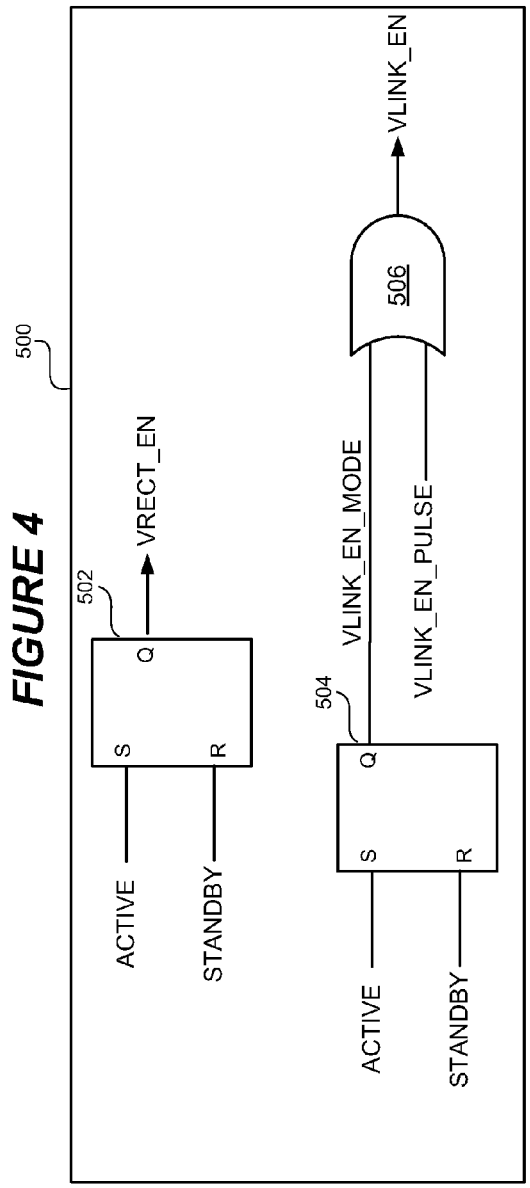
FIG. 5 depicts an exemplary sense enable controller of the electronic power control system of FIG. 2A.

Referring to FIG. 3, from time $t_0$ until time $t_6$, the link voltage $V_{LINK}$ is greater than $H \cdot V_{TARGET}$. Therefore, controller 202 operates in standby mode. In standby mode, sense enable controller 206 at least intermittently disables sensing of the input voltage $V_X$ by causing switch 208 to at least intermittently turn "OFF" (i.e. nonconductive). In at least one embodiment, as depicted in FIG. 3, in standby mode, sense enable controller 206 continuously disables sensing of the input voltage $V_X$ in standby mode. Switch 208 can be any type of switch, such as field effect transistor (FET). The input voltage is represented by current $i_{VX\_SENSE}$, which flows through sense resistor 112 when switch 208 is ON. The actual implementation of sense enable controller 206 is a matter of design choice. FIG. 5 depicts an exemplary implementation of sense enable controller 206.

Current $i_{VX\_SENSE}$ is generated from the input voltage $V_X$, and current $i_{VX\_SENSE}$ causes a power loss across resistor 112. Processing the sense signal RSENSE, which represents the input voltage $V_X$, by controller 202 also requires power. However, when switch 208 is turned OFF during the standby mode of controller 202, current $i_{VX\_SENSE}$ is zero, thus, eliminating the power loss associated with sensing the input voltage $V_X$.

In at least one embodiment and as shown in FIGS. 2A and 3, sense enable controller 206 controls switch 208 with input sense enable signal VRECT_EN. In at least one embodiment, sense enable controller 206 generates input sense enable signal VRECT_EN as a continuous logical "0" during standby mode, thus, turning switch 208 "OFF". In another embodiment, sense enable controller 206 intermittently enables and disables switch 208 by intermittently generating pulses of enable signal VRECT_EN, which intermittently turns switch 208 ON and OFF. When switch 208 is turned ON, controller 202 receives signal RSENSE and determines a value of input voltage $V_X$. Intermittent enabling and disabling of switch 208 can be periodic or non-periodic.

As previously discussed, the value of the link voltage $V_{LINK}$ indicates power requirements of load 203. Thus, during standby mode, the mode controller 204 intermittently senses the link voltage $V_{LINK}$ via the link voltage sense signal LSENSE to determine when to enter and exit standby mode. In at least one embodiment, the link voltage signal LSENSE represents the link voltage sense current $i_{LINK\_SENSE}$.

Referring to FIGS. 2A and 3, from times $t_1$ to $t_4$, controller 202 initiates a link voltage sensing process. In at least one embodiment, to intermittently sense the link voltage, sense enable controller 206 generates a pulse 302 of link sense enable signal VLINK_EN from time $t_1$ to time $t_3$. The pulse 302 turns switch 210 ON. Switch 210 can be any type of switch, such as a FET. The voltage $V_{LSENSE}$ at node 214 rises between time $t_1$ and $t_3$ in accordance with an RC time constant "TC" of parasitic impedances associated with node 214. At time $t_2$, the mode controller 204 begins sampling the sense signal LSENSE at the sampling frequency $f_{SAMPLE}$. The width of pulse 302 is a matter of design choice. In at least one embodiment, the pulse width $(t_1-t_3)$ of pulse 302 is sufficient to (i) allow $V_{LSENSE}$ and, thus, LSENSE, to rise to a steady state voltage $V_1$ that accurately represents the link voltage $V_{LINK}$ and (ii) allow mode controller 204 to obtain a number samples, such as 10-20 samples, while switch 210 is ON. Mode controller 204 continues sampling sense signal LSENSE until time $t_4$. The relative timing of time $t_4$ is a matter of design choice, and, in at least one embodiment, is selected to allow the mode controller 204 to obtain sufficient samples of sense signal LSENSE to determine the state of link voltage $V_{LINK}$. In at least one embodiment, the frequency of enable signal VLINK_EN is 1 kHz, the frequency of $f_{SAMPLE}$ is 2.5 MHz, and the pulse width 302 is $3 \cdot TC + 20/f_{SAMPLE}$, where "TC" is the RC time constant of parasitic impedances associated with node 214.

At time $t_3$, the sense signal LSENSE indicates that the voltage $V_{LSENSE}$ is at voltage level $V_1$, which corresponds to a link voltage above $H \cdot V_{TARGET}$. Thus, the link voltage $V_{LINK}$ is still adequate to supply specified power to load 203 while the controller 202 remains standby mode. Mode controller 204 generates the STANDBY signal so that controller 202 remains in standby mode. The sense enable controller 206 receives the STANDBY signal and generates a logical 0 for enable signal VLINK_EN from time $t_3$ to time $t_5$. When the enable signal VLINK_EN is a logical 0, switch 210 is turned OFF. Thus, from time $t_3$ to $t_5$, in addition to saving power by turning switch 210 OFF during standby mode, controller 206 also reduces standby power consumption by not drawing the sense current $i_{LINK\_SENSE}$.

At time $t_5$, the link voltage sensing process repeats beginning with the assertion of the pulse 304 of enable signal VLINK_EN. From time $t_5$ to time $t_6$, the link voltage $V_{LINK}$ falls from above $H \cdot V_{TARGET}$ to below $L \cdot V_{TARGET}$. "L" is a multiplication factor corresponding to the percentage decrease in the link voltage below $V_{TARGET}$, which is used by mode controller 204 to trigger exit of the standby mode and entry into the active mode. The $L \cdot V_{TARGET}$ voltage represents an active mode threshold voltage. The value of L is a design choice. In at least one embodiment, L equals 0.9, which corresponds to a 10% decrease in the link voltage below the target voltage. The link voltage $V_{LINK}$ is an indicator of when to enter active mode because, with the controller 202 in standby mode, the link voltage $V_{LINK}$ decreases when power consumption by the load 203 increases.

At time $t_5$, voltage $V_{LSENSE}$ drops to voltage level $V_2$ corresponding to a link voltage $V_{LINK}$ at $L \cdot V_{TARGET}$. Thus, at time $t_5$, mode controller 204 samples signal LSENSE, and sense signal LSENSE indicates that the power consumption by the load 203 has increased. Mode controller 204 generates the ACTIVE signal so that controller 202 exits standby mode and enter active mode. The sense enable controller 206 receives the ACTIVE signal and, at time $t_7$ generates a logical 1 for enable signal VRECT_EN to cause switch 208 to conduct and allow controller 202 to sense the input voltage $V_X$ via sense signal RSENSE. In active mode, sense enable controller 206 keeps enable signal VLINK_EN at logical 1 to cause switch 210 to stay ON.

Generation of the ACTIVE signal causes the controller 202 to enter active mode and, thus, at time $t_7$ generate control signal $CS_1$ to control switching power converter 104 by, for example, regulating the link voltage $V_{LINK}$ and providing power factor correction. An exemplary description of the generation of control signal $CS_1$ is set forth in U.S. Pat. No. 7,719,246, entitled "Power Control System Using a Nonlinear Delta-Sigma Modulator with Nonlinear Power Conversion Process Modeling", filed Dec. 31, 2007, inventor John L. Melanson, and assignee Cirrus Logic, Inc., which is hereby incorporated by reference.

Figure 4:
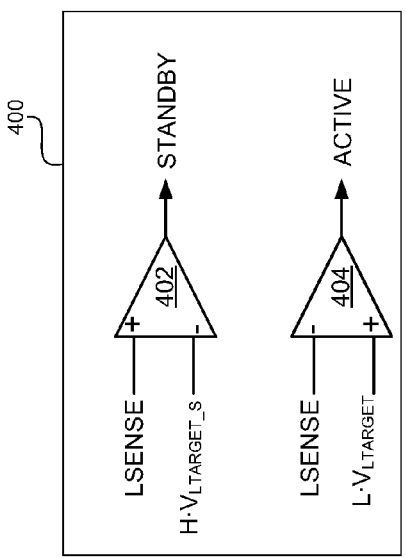
FIG. 4 depicts an exemplary mode controller of the electronic power control system of FIG. 2A.

FIG. 4 depicts mode controller 400, which represents one embodiment of mode controller 204. FIG. 4 depicts an implementation of mode controller 204 using comparators 402 and 404. Comparator 402 compares the sense signal LSENSE with $H \cdot V_{TARGET\_S}$. "$H \cdot V_{TARGE\_S}$" is a scaled version of $H \cdot V_{TARGET}$ corresponding to the scaling of sense signal LSENSE to the link voltage $V_{LINK}$. When enable signal LSENSE is greater than $H \cdot V_{TARGET\_S}$, the STANDBY signal is a logical 1, which causes the controller 202 to enter standby mode or remain in standby mode. Otherwise, the STANDBY signal is a logical 0. In at least one embodiment, there is hysteresis in operational mode with regard to the state of the STANDBY and ACTIVE signals. Thus, in at least one embodiment, controller 202 remains in standby mode after the STANDBY signal is a logical 0 until the ACTIVE signal is a logical 1, and vice versa. Comparator 404 compares the sense signal LSENSE with $L \cdot V_{TARGET\_S}$. "$L \cdot V_{TARGET\_S}$" is a scaled version of $L \cdot V_{TARGET}$ also corresponding to the scaling of sense signal LSENSE to the link voltage $V_{LINK}$. When enable signal LSENSE is less than $L \cdot V_{TARGET\_S}$, the ACTIVE signal is a logical 1, which causes the controller 202 to enter active mode.

FIG. 5 depicts sense enable controller 500, which represents one embodiment of sense enable controller 206. Referring to FIGS. 2A and 5, the R-S flip-flop 502 has a set input S to receive the ACTIVE signal from mode controller 204 and a reset input R to receive the STANDBY signal from mode controller 204. Whenever the ACTIVE signal is a logical 1, the output enable signal VRECT_EN of the R-S flip-flop 502 is also a logical 1, which causes switch 208 to conduct. The enable signal VRECT_EN remains a logical 1 until the STANDBY signal is a logical 1. When the STANDBY signal is a logical 1, the R-S flip-flop 502 drives the enable signal VRECT_EN to a logical 0, which causes switch 208 to stop conducting. The enable signal VRECT_EN remains a logical 0 until the ACTIVE signal transitions to a logical 1.

R-S flip-flop 504 generates the VLINK_EN_MODE output signal in the same manner that R-S flip-flop 502 generates the enable signal VRECT_EN. Thus, the VLINK_EN_MODE output signal has the same state as enable signal VRECT_EN. OR gate 506 performs a logical OR operation between VLINK_EN_MODE and VLINK_EN PULSE. Signal VLINK_EN PULSE is a pulse having a period equal to the period of pulse 302 (FIG. 3) and a frequency equal to the same frequency as VRECT_EN in FIG. 3. Thus, in the active mode, sense enable signal VLINK_EN is a logical 1. In standby mode, sense enable signal VLINK_EN is pulsed in accordance with the link voltage sensing process described in conjunction with FIGS. 2A and 3.

Figure 6:
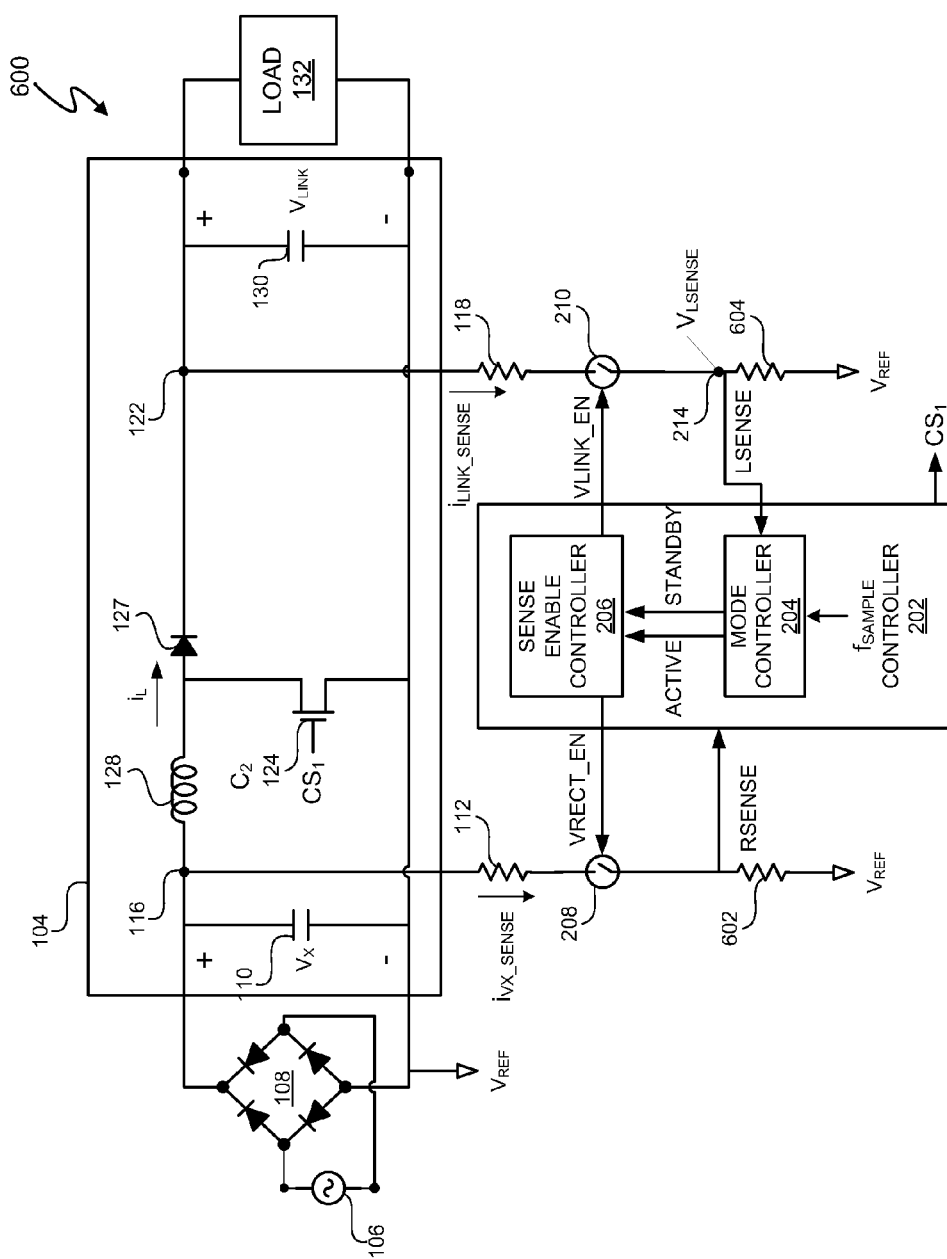
FIG. 6 depicts an electronic power control system having a controller to at least intermittently disable sensing of an input voltage to the switching power converter during standby mode using voltage sensing.

FIG. 6 depicts electronic power control system 600. Electronic power control system 600 functions identically to electronic power control system 200A, except that sense signals RSENSE and LSENSE are voltage signals. Sense signal RSENSE represents the voltage across resistor 602, and sense signal LSENSE is the voltage $V_{LSENSE}$ across resistor 604.

Figure 7:
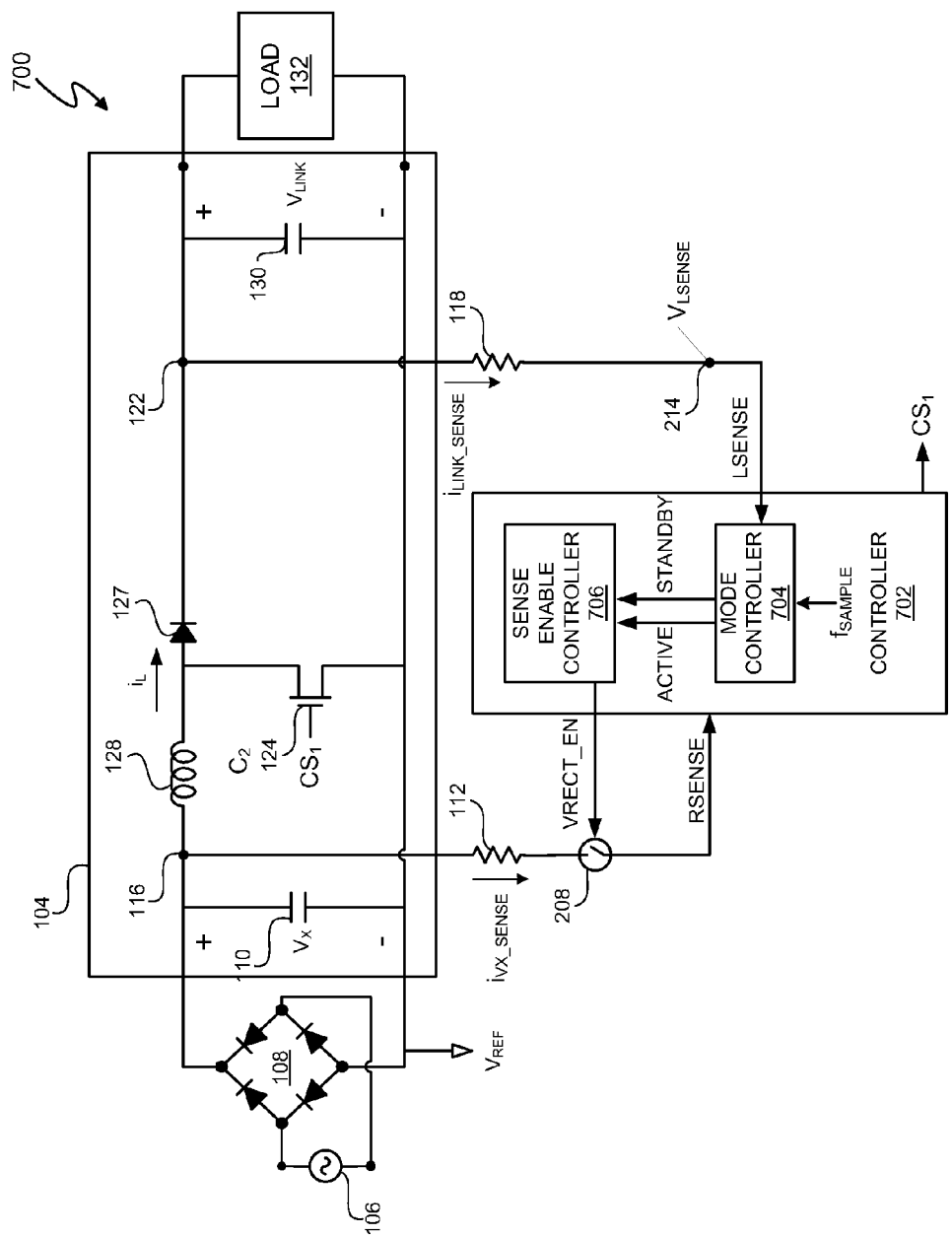
FIG. 7 depicts an electronic power control system having a controller to at least intermittently disable sensing of an input voltage to the switching power converter during standby mode using voltage sensing.
Figure 8:
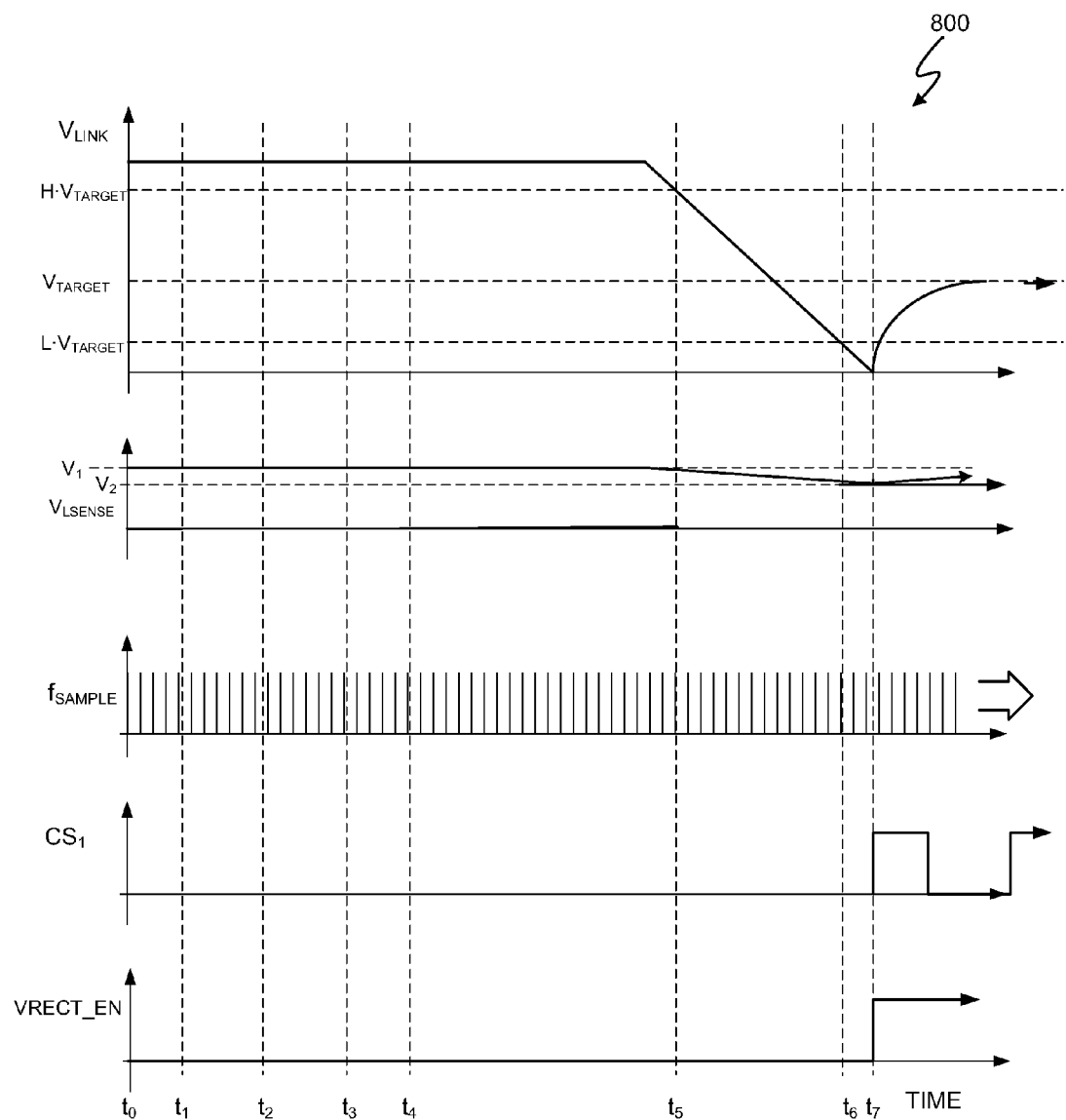
FIG. 8 exemplary signals associated with the electronic power control system of FIG. 7.

FIG. 7 depicts electronic power control system 700. FIG. 8 depicts exemplary signals 800 associated with the electronic power control system 700. Referring to FIGS. 7 and 8, electronic power control system 700 functions identically to electronic power control system 200A with respect to the generation of the enable signal VRECT_EN except that electronic power control system 700 eliminates switch 210 and continuously monitors sense signal LSENSE in both active and standby modes. Mode controller 704 is identical to mode controller 204 except that mode controller 204 continuously samples sense signal LSENSE at the sample frequency $f_{SAMPLE}$ and continually processes sense signal LSENSE to determine whether the controller 702 should operate in the active mode or the standby mode. Sense enable controller 706 is identical to sense enable controller 206 except that sense enable controller 706 generates the enable signal VRECT_EN and does not include components to generate the enable signal VLINK_EN. The $V_{LSENSE}$ voltage at node 214 tracks the link voltage $V_{LINK}$ since current $i_{LINK\_SENSE}$ is not interrupted.

Thus, electronic power control system 700 does not obtain the power savings by enabling and disabling sensing of the link voltage $V_{LINK}$ during standby mode. However, electronic power control system 700 has a reduced cost associated with an absence of switch 210.

Figure 9:
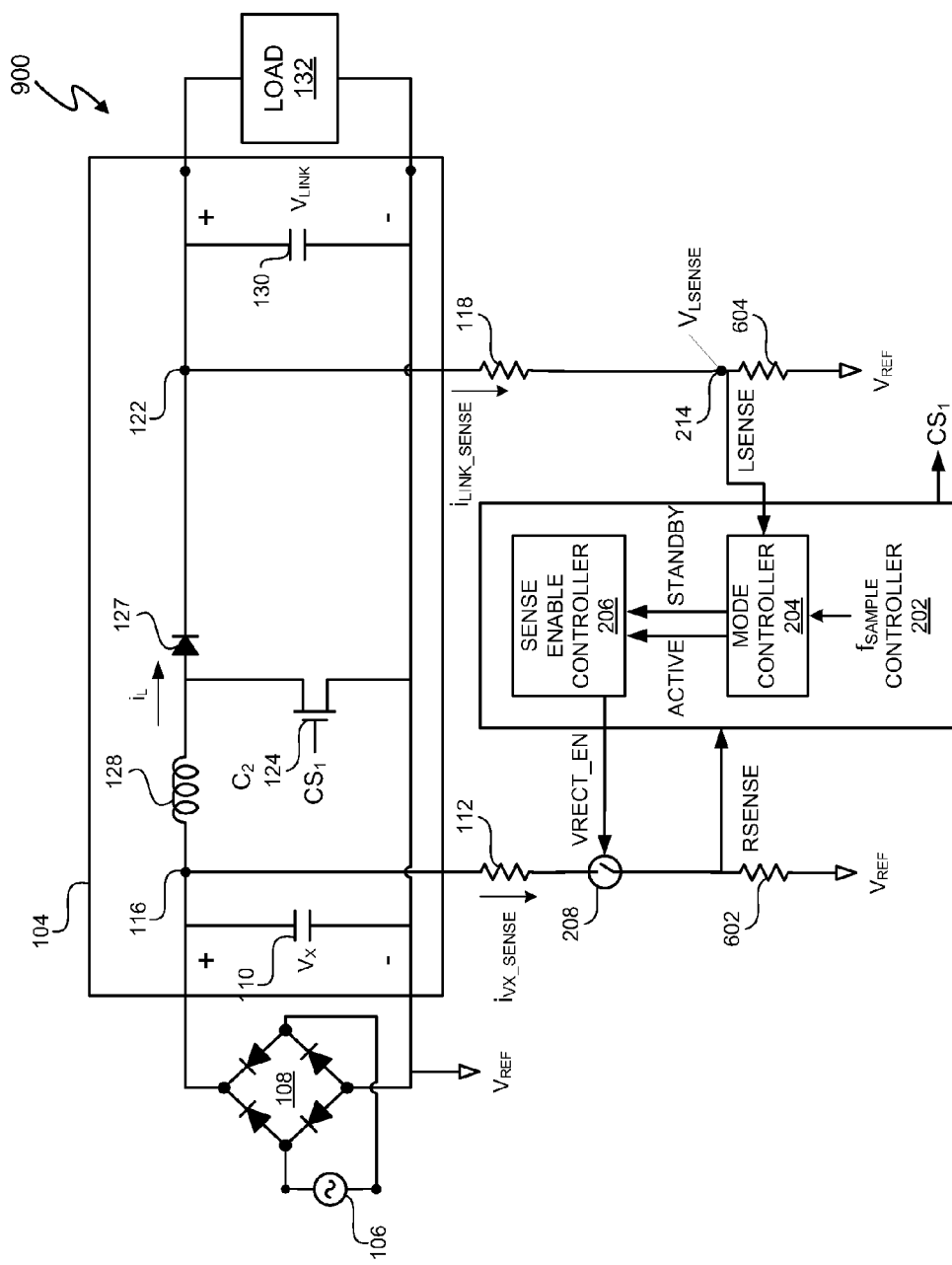
FIG. 9 depicts an electronic power control system having a controller to at least intermittently disable sensing of an input voltage to the switching power converter during standby mode using voltage sensing.

FIG. 9 depicts electronic power control system 900. Electronic power control system 900 functions identically to electronic power control system 700, except that sense signals RSENSE and LSENSE are voltage signals. Sense signal RSENSE represents the voltage across resistor 602, and sense signal LSENSE is the voltage $V_{LSENSE}$ across resistor 604.

Figure 10:
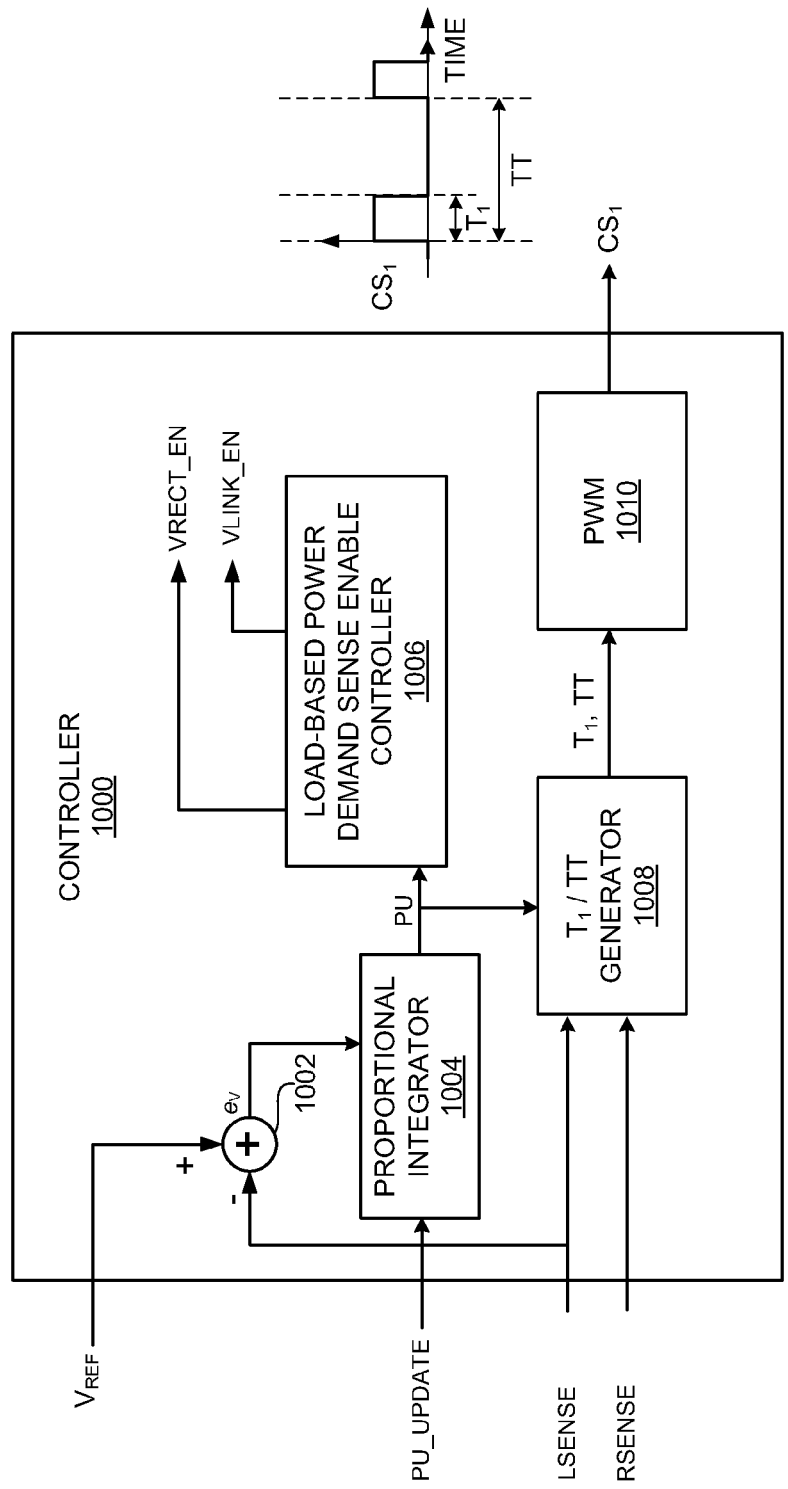
FIG. 10 depicts a controller that represents one embodiment of the controller in FIG. 2A.

FIG. 10 depicts a controller 1000, which represents one embodiment of the controller 201. In at least one embodiment, the controller 1000 includes a microprocessor and a memory (not shown) having code executable by the processor to implement some or all of the operations of the controller 1000. Controller 1000 receives the sense signals LSENSE and RSENSE, which respectively represent link voltage $V_{LINK}$ and input voltage $V_X$. Subtraction operator 1002 subtracts the sense signal LSENSE from a reference voltage $V_{REF}$ to generate an error signal $e_V$. The reference signal $V_{REF}$ represents a threshold link voltage. Thus, the error signal $e_V$ represents a comparison value between the sense signal LSENSE and the reference voltage $V_{REF}$. As the load 203 requires less power, less current is drawn from link capacitor 130 (FIG. 2). As less current is drawn from capacitor 130, the link voltage $V_{LINK}$ will begin to increase. Thus, since the sense signal LSENSE is directly proportional to the link voltage $V_{LINK}$, the sense signal LSENSE increases above the reference voltage $V_{REF}$ as the power utilization of load 203 decreases. Conversely, when the power utilization of load 203 increases, more current is drawn from capacitor 130, and the link voltage $V_{LINK}$, and correspondingly the sense signal LSENSE will decrease. Thus, the error signal $e_V$ indicates that the load 203 needs more or less power to operate.

A proportional integrator 1004 performs a proportional integration on the error signal $e_V$ and generates a power utilization factor PU representing the power demand of load 203. The proportional integrator 1004 attempts to drive the error signal $e_V$ to zero (0) and compensates for changes in the error signal $e_V$ over time to generate a stable power utilization factor PU. In at least one embodiment, the power utilization factor PU is a value ranging from 0 to 1, with 0 corresponding to zero power utilization and 1 corresponding to 100% power utilization by load 203 of power available from switching power converter 205 (FIG. 2). In at least one embodiment, the subtraction operator 1002 and proportional integrator 1004 dynamically determine the power utilization of the load 203 during each cycle of the input voltage $V_X$.

In at least one embodiment, the load-based power demand sense enable controller 1006 generates the link sense enable signal VLINK_EN to enable and disable sensing of the link voltage $V_{LINK}$ with, for example, the same timing as described in conjunction with the enabling and disabling of link sense enable signal VLINK_EN of FIG. 3. In at least one embodiment, controller 1006 continuously monitors link sense enable signal VLINK_EN as described, for example, in conjunction with FIGS. 7 and 9.

The load-based power demand sense enable controller 1006 generates the input sense enable signal VRECT_EN using the power utilization factor PU. In at least one embodiment, the load-based power demand sense enable controller 1006 executes the following pseudocode to at least intermittently enable and disable sensing the input voltage $V_X$ and the link voltage $V_{LINK}$:

Update the power utilization factor PU;
if the value of the power utilization factor PU is greater than a power utilization threshold value $PU_{TH}$, then:
  controller 1000 mode=active mode;
  input sense enable signal VRECT_EN=1;
  link sense enable signal VLINK_EN=1;
else
  controller 1000 mode=standby mode;
  input sense enable signal VRECT_EN=0;
  intermittently pulse link sense enable signal VLINK_EN;
  Return to line (1).

Line (0) of the code causes the proportional integrator 1004 to update the power utilization factor PU, for example, in accordance with a periodic command from the PU_UPDATE signal.

Line (1) of the code determines if the power utilization value PU is greater than the power utilization threshold value $PU_{TH}$. An exemplary value of $PU_{TH}$ is 0.05. If PU is greater than the threshold value $PU_{TH}$, the power demand of load 203 is large enough for controller 1000 to generate the control signal $CS_1$ to cause switching power converter 203 to actively maintain the link voltage $V_{LINK}$ at a voltage level to meet operating specifications for the load 203. The power utilization threshold value $PU_{TH}$ can be preset in the load-based power demand sense enable controller 1006 or programmed into load-based power demand sense enable controller 1006.

Line (1a) of the code sets the mode of the controller 1000 to active so that controller 1000, for example, actively generates the control signal $CS_1$.

Line (1b) of the code sets input sense enable signal VRECT_EN to a logical 1, which causes switch 208 to conduct thereby enabling the controller 1000 to sense the input voltage $V_X$.

Line (1c) of the code sets input sense enable signal VRECT_EN to a logical 1, which causes switch 208 to conduct thereby enabling the controller 1000 to continuously sense the link voltage $V_{LINK}$.

Line (2) executes if the power utilization value PU is less than or equal to the power utilization threshold value $PU_{TH}$, which indicates that the power demand by load 203 is low enough that the controller 1000 does not need to actively maintain the link voltage $V_{LINK}$ for load 203.

Line (2a) of the code sets the mode of the controller 1000 to standby mode and stops actively generating the control signal $CS_1$.

Line (2b) of the code sets input sense enable signal VRECT_EN to a logical 0, which causes switch 208 to open and thereby disable sensing of the input voltage $V_X$ by the controller 1000.

Line (2c) of the code sets input sense enable signal VRECT_EN to pulse to intermittently enable and disable sensing of the link voltage $V_{LINK}$ for generation of the power utilization value PU.

Line (3) causes the process to repeat.

Figure 11:
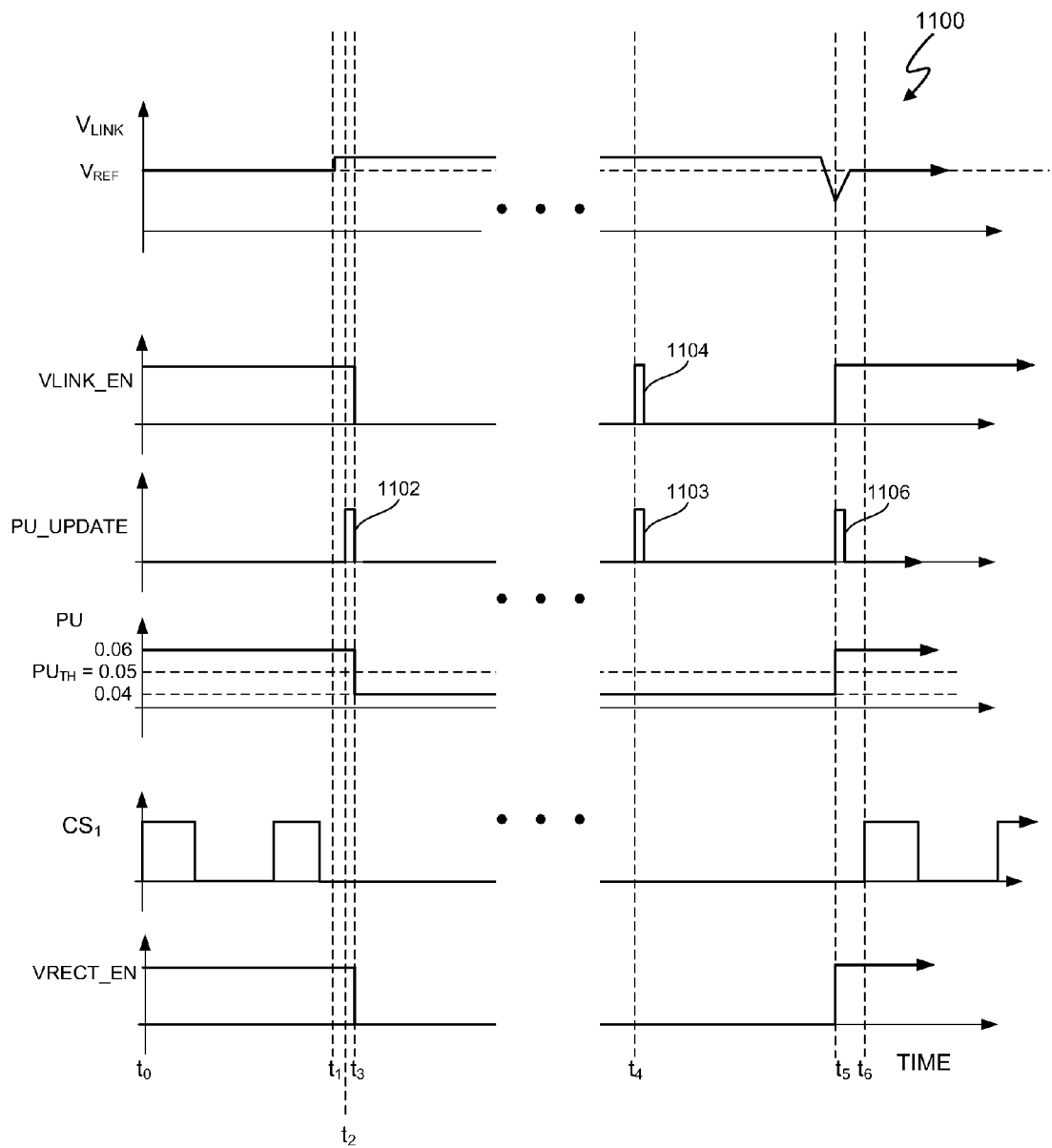
FIG. 11 depicts exemplary signals associated with controller of FIG. 2A.

FIG. 11 depicts exemplary signals 1100 associated with controller 1000 and electronic power control system 200. Referring to FIGS. 2, 10, and 11, when the link voltage $V_{LINK}$ is less than or equal to the reference voltage $V_{REF}$ the power utilization value PU is greater than the power utilization threshold $PU_{TH}$ equal to 0.05. A power utilization value PU value greater than 0.05 indicates that the power demand by load 203 is high enough so that controller 1000 is in the active mode and generates control signal $CS_1$ to control the switching power converter 203. The generation of control signal $CS_1$ is subsequently described in more detail.

At time $t_1$, the link voltage $V_{LINK}$ rises due to a decrease in power demand by load 203. The pulse 1102 of the PU_UPDATE signal causes the proportional integrator 1104 to update the value of the power utilization value PU at time $t_2$. At time $t_3$, the power utilization value PU has dropped to 0.04, which indicates that the power demand of load 203 does not require generation of control signal $CS_1$. At time $t_3$, the load-based power demand sense enable controller 1006 generates input sense enable signal VRECT_EN to turn switch 208 OFF and causes the controller 1000 to enter a standby mode. When switch 208 is OFF, sensing the input voltage via sense signal $R_{SENSE}$ is disabled. At time $t_3$, the load-based power demand sense enable controller 1006 generates the link sense enable signal VLINK_EN to also turn switch 205 OFF until the next pulse 1103 of the PU_UPDATE signal at time $t_4$.

At time $t_4$, load-based power demand sense enable controller 1006 generates a pulse 1104 of the link sense enable signal VLINK_EN, which turns switch 205 ON. The controller 1000 samples the link voltage $V_{LINK}$ via sense signal LSENSE. Since the link voltage $V_{LINK}$ remains at the same level above the reference voltage $V_{REF}$ at time $t_4$, the value of the power utilization value PU is unchanged at 0.04. At time $t_5$, the next pulse 1106 of the PU_UPDATE signal causes the link sense enable signal VLINK_EN to enable controller 1000 to sense the link voltage $V_{LINK}$ via sense signal LSENSE. At time $t_5$, the error signal $e_V$ indicates that the link voltage $V_{LINK}$ is less than reference voltage $V_{REF}$. Thus, at time $t_5$, the power utilization of the load 203 has increased in this example to correspond to a power utilization value PU or 0.06.

Since at time $t_5$ the power utilization of the load 203 has increased above the power utilization demand threshold of $PU_{TH}$ equal to 0.05, the load-based power demand sense enable controller 1006 causes the controller 1000 to enter the active mode and continuously generate the input sense enable signal VRECT_EN and the link sense enable signal VLINK_EN to turn respective switches 208 and 210 ON. Once in the active mode, at time $t_6$ the controller 1000 has enabled sensing of the input voltage $V_X$ and the link voltage $V_{LINK}$ and generates control signal $CS_1$.

Referring to FIG. 10, controller 1000 includes a $T_1$/TT generator 1008 to determine $T_1$ and TT of the control signal $CS_1$. "$T_1$" is the pulse width of control signal $CS_1$, and "TT" is the period of control signal $CS_1$. The $T_1$/TT generator 1008 provides the determined values of $T_1$ and TT to pulse width modulator (PWM) 1010. PWM 1010 generates the control signal $CS_1$ in accordance with the values of $T_1$ and TT received from the $T_1$/TT generator 1008.

The particular implementation of the $T_1$/TT generator 1008 and the proportional integrator 1004 are matters of design choice. In at least one embodiment, the $T_1$/TT generator 1008 and proportional integrator are implemented as described in U.S. Pat. No. 7,719,246, entitled "Power Control System Using a Nonlinear Delta-Sigma Modulator with Nonlinear Power Conversion Process Modeling", filed Dec. 31, 2007, inventor John L. Melanson, and assignee Cirrus Logic, Inc., which is hereby incorporated by reference in its entirety.

Figure 12:
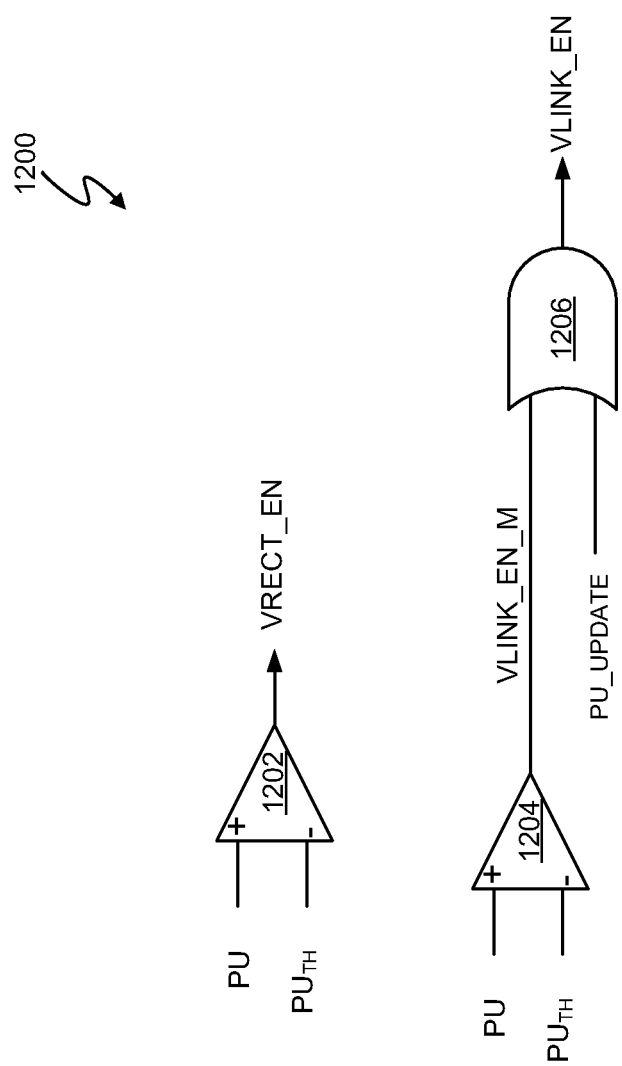
FIG. 12 depicts an exemplary load-based power demand sense enable controller.

FIG. 12 depicts an exemplary load-based power demand sense enable controller 1200, which represents one embodiment of the load-based power demand sense enable controller 1006. Comparator 1202 compares the power utilization factor PU with the power utilization threshold $PU_{TH}$, and the output of comparator 1202 is the input sense enable signal VRECT_EN. If the power utilization factor PU is greater than the power utilization threshold value $PU_{TH}$, then input sense enable signal VRECT_EN is a logical 1. In this embodiment, if input sense enable signal VRECT_EN is a logical 1, the controller 1000 enters and remains the active mode to provide more power to load 203. If the power utilization factor PU is less than the power utilization threshold value $PU_{TH}$, then input sense enable signal VRECT_EN is a logical 0. In this embodiment, if input sense enable signal VRECT_EN is a logical 0, the controller 1000 enters and remains in the standby mode.

Comparator 1204 compares the power utilization factor PU with the power utilization threshold value $PU_{TH}$, and the output of comparator 1204 is a signal VLINK_EN_M. Signal VLINK_EN_M is a logical 1 when the power utilization factor PU is greater than the power utilization threshold value $PU_{TH}$, and signal VLINK_EN_M is a logical 0 when the power utilization factor PU is less than the power utilization threshold value $PU_{TH}$. Logical gate 1206 performs a logical OR operation on the two input signals VLINK_EN_M and PU_UPDATE. If either VLINK_EN_M or PU_UPDATE is a logical 1, the link sense enable signal VLINK_EN is a logical 1, and controller 1000 enables sensing of the link voltage $V_{LINK}$. If both VLINK_EN_M and VLINK_EN_PULSE are a logical 0, then controller 1000 disables sensing of the link voltage $V_{LINK}$.

Thus, a system and method provides energy savings for an electronic power control system when a controller of the electronic power control system reduces sense signal sensing during a standby mode of the controller. In one embodiment, the controller achieves energy savings by enabling and disabling sensing of an input voltage to a switching power converter. In another embodiment, the controller achieves energy savings by enabling and disabling sensing of an input voltage and a link voltage of the switching power converter.

Although embodiments have been described in detail, it should be understood that various changes, substitutions, and alterations can be made hereto without departing from the spirit and scope of the invention as defined by the appended claims.

What is claimed is:

1. A method comprising:
   during a standby mode of a switching power converter controller:
      at least intermittently disabling sensing of an input voltage to a switching power converter; and
      sensing a link voltage at least intermittently; and
   exiting the standby mode and enabling sensing of the input voltage when the sensed link voltage indicates a predetermined power demand by a load coupled to the switching power converter;
   wherein during the standby mode the switching power converter controller ceases generating a control switch signal to control power conversion by the switching power converter.

2. The method of claim 1 wherein the at least intermittently disabling sensing of the input voltage to the switching power converter comprises continuously disabling sensing of the input voltage to the switching power converter during the standby mode of the switching power converter controller.

3. The method of claim 1 wherein the at least intermittently disabling sensing of the input voltage to the switching power converter comprises:
   generating a gate drive signal to control a field effect transistor coupled to an input of the switching power converter.

4. The method of claim 1 further comprising:
   during a standby mode of the switching power converter controller:
      enabling and disabling sensing the link voltage of the switching power converter;
      sensing the link voltage when sensing of the link voltage is enabled; and exiting the standby mode and monitoring the link voltage when the sensed link voltage indicates power demand by the load coupled to the switching power converter.

5. The method of claim 4 wherein:
the enabling and disabling sensing the link voltage of the switching power converter during the standby mode further comprises intermittently enabling and disabling sensing the link voltage of the switching power converter; and
sensing the link voltage when sensing of the link voltage is enabled further comprises intermittently sensing the link voltage when sensing of the link voltage is enabled.

6. The method of claim 1 further comprising:
generating a link sensing control signal to intermittently enable and disable sensing the link voltage of the switching power converter.

7. The method of claim 6 wherein the link sensing control signal is capable of controlling a field effect transistor coupled to the switching power converter.

8. The method of claim 1 wherein when generating the link sensing control signal to enable sensing the link voltage, the method further comprising:
sensing the link voltage via a sense current corresponding to the link voltage.

9. The method of claim 1 wherein when generating the link sensing control signal to enable sensing the link voltage, the method further comprising:
sensing the link voltage via a sense voltage corresponding to the link voltage.

10. The method of claim 1 wherein when generating the link sensing control signal to enable sensing the link voltage, the method further comprising:
sensing the link voltage following a delay after generating the link sensing control signal to allow dissipation of parasitic signals.

11. The method of claim 1 further comprising:
utilizing the link voltage to determine a power utilization value that indicates power demand by the load;
entering standby mode when the power utilization value indicates that the power demand by the load is below the predetermined power demand; and
wherein the exiting the standby mode and enabling sensing of the input voltage when the sensed link voltage indicates a predetermined power demand by the load further comprises exiting the standby mode and enabling sensing of the input voltage when the power utilization value is greater than a power utilization threshold value.

12. An apparatus comprising:
a controller to control a switching power converter, the controller configured to:
during a standby mode of the controller:
at least intermittently disable sensing of an input voltage to the switching power converter; and
sense a link voltage at least intermittently; and
exit the standby mode and enabling sensing of the input voltage when the sensed link voltage indicates a predetermined power demand by a load coupled to the switching power converter;
wherein during the standby mode the controller ceases generating a control switch signal to control power conversion by the switching power converter.

13. The apparatus of claim 12 wherein the controller is further configured to:
continuously disable sensing of the input voltage to the switching power converter during the standby mode of the switching power converter.

14. The apparatus of claim 12 wherein the controller is further configured to:
generate a gate drive signal to control a field effect transistor coupled to an input of the switching power converter.

15. The apparatus of claim 12 wherein the controller is further configured to:
during a standby mode of the controller:
enable and disable sensing the link voltage of the switching power converter;
sense the link voltage when sensing of the link voltage is enabled; and
exit the standby mode and monitoring the link voltage when the sensed link voltage indicates power demand by the load coupled to the switching power converter.

16. The apparatus of claim 15 wherein:
to enable and disable sensing the link voltage of the switching power converter during the standby mode, the controller is further configured to intermittently enable and disable sensing the link voltage of the switching power converter; and
to sense the link voltage when sensing of the link voltage is enabled, the controller is further configured to intermittently sensing the link voltage when sensing of the link voltage is enabled.

17. The apparatus of claim 12 wherein the controller is further configured to:
generate a link sensing the control signal to intermittently enable and disable sensing a link voltage of the switching power converter.

18. The apparatus of claim 17 wherein the link sensing control signal is capable of controlling a field effect transistor coupled to the switching power converter.

19. The apparatus of claim 12 wherein the controller is further configured to:
sense the link voltage via a sense current corresponding to the link voltage when generating the link sensing control signal to enable sensing the link voltage.

20. The apparatus of claim 12 wherein the controller is further configured to:
sense the link voltage via a sense voltage corresponding to the link voltage when generating the link sensing control signal to enable sensing the link voltage.

21. The apparatus of claim 12 wherein the controller is further configured to:
sense the link voltage following a delay after generating the link sensing control signal to allow dissipation of parasitic signals when generating the link sensing control signal to enable sensing the link voltage.

22. The apparatus of claim 12 wherein the controller is further configured to:
utilize the link voltage to determine a power utilization value that indicates power demand by the load;
enter standby mode when the power utilization value indicates that the power demand by the load is below the predetermined power demand; and
exit the standby mode and enabling sensing of the input voltage when the power utilization value is greater than a power utilization threshold value.

23. An apparatus comprising:
a switching power converter;
a load coupled to the switching power converter;
a controller coupled to the switching power converter, wherein the controller is configured to:

during standby mode of the controller:
  at least intermittently disable sensing of an input voltage to the switching power converter; and
  sense the link voltage at least intermittently;
exit the standby mode and enabling sensing of the input voltage when the sensed link voltage indicates a predetermined power demand by the load coupled to the switching power converter;
wherein during the standby mode the controller ceases generating a control switch signal to control power conversion by the switching power converter.

24. The apparatus of claim 23 wherein the load comprises one or more light emitting diodes.

* * * * *